(12) United States Patent
Kubota

(10) Patent No.: US 9,100,599 B2
(45) Date of Patent: Aug. 4, 2015

(54) IMAGE CAPTURE APPARATUS AND CONTROL METHOD THEREOF

(75) Inventor: Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 333 days.

(21) Appl. No.: 13/335,098

(22) Filed: Dec. 22, 2011

(65) Prior Publication Data

US 2012/0188432 A1  Jul. 26, 2012

(30) Foreign Application Priority Data

Jan. 26, 2011 (JP) ................................. 2011-014384

(51) Int. Cl.
*H04N 5/235* (2006.01)
*H04N 5/353* (2011.01)
*H04N 5/238* (2006.01)
*H04N 5/345* (2011.01)

(52) U.S. Cl.
CPC ............. *H04N 5/3532* (2013.01); *H04N 5/238* (2013.01); *H04N 5/2352* (2013.01); *H04N 5/2353* (2013.01); *H04N 5/3454* (2013.01)

(58) Field of Classification Search
None
See application file for complete search history.

(56) References Cited

U.S. PATENT DOCUMENTS

2008/0267608 A1* 10/2008 Kubota ......................... 396/374
2010/0013955 A1*  1/2010 Nagasaki ................... 348/229.1

FOREIGN PATENT DOCUMENTS

| JP | 09-102905 | 4/1997 |
| JP | 11-112865 | 4/1999 |
| JP | 2010-268156 | 11/2010 |

\* cited by examiner

*Primary Examiner* — Twyler Haskins
*Assistant Examiner* — Angel L Garces-Rivera
(74) *Attorney, Agent, or Firm* — Cowan, Liebowitz & Latman, P.C.

(57) ABSTRACT

An image capture apparatus that carries out exposure control by driving an aperture includes: an image sensor, including multiple pixels, that accumulates and transfers charges per predetermined pixel group; a determination unit that determines an image region in the image sensor that serves as a region from which to output image data for recording or image data for display; and a control unit that drives the aperture within a period in which charge accumulation for the image data for recording or the image data for display is not being carried out for the pixels included in the image region determined by the determination unit.

12 Claims, 17 Drawing Sheets

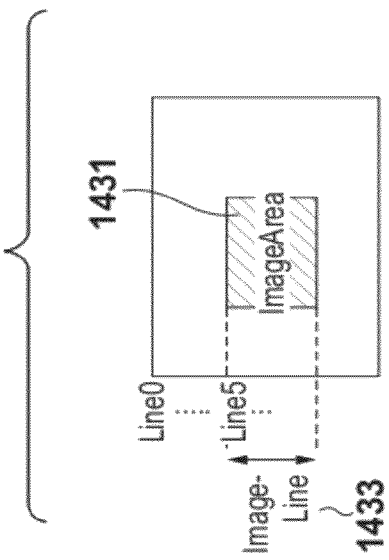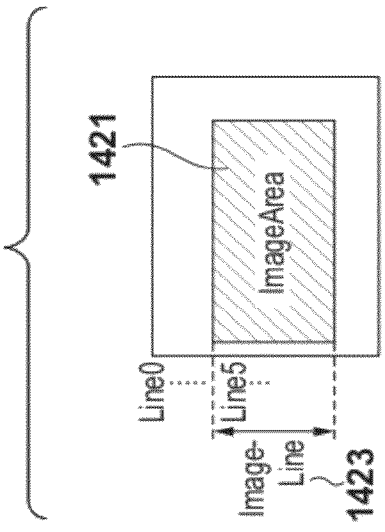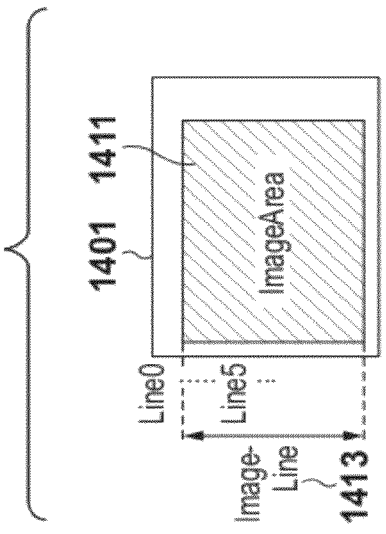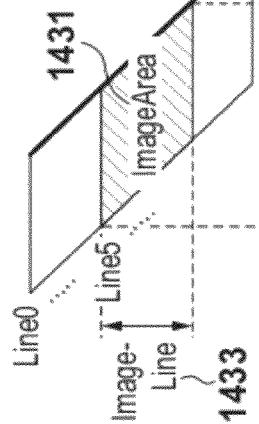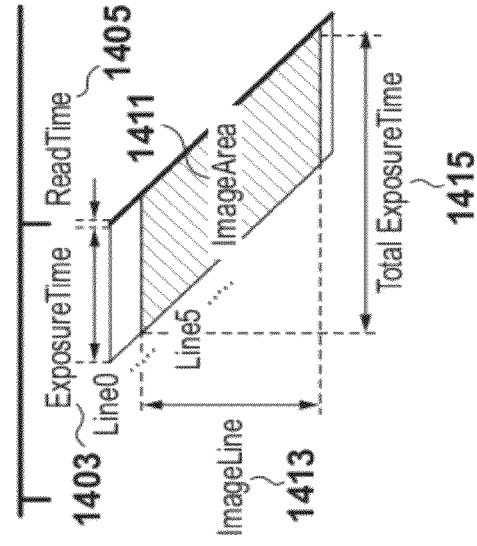
FIG. 14A  FIG. 14B  FIG. 14C

IMAGE CAPTURE APPARATUS AND CONTROL METHOD THEREOF

BACKGROUND OF THE INVENTION

1. Field of the Invention

The present invention relates to exposure control techniques in image capture apparatuses.

2. Description of the Related Art

In image capture apparatuses that use image sensors, such as digital cameras, exposure control is carried out on the image sensor for a variety of purposes and applications. An aperture mechanism that adjusts the exposure amount of the image sensor, an electronic shutter mechanism that adjusts the charge accumulation period of the image sensor, a gain mechanism that adjusts the level of the signal read out from the image sensor, and so on exist as mechanisms used in exposure control.

In the case where the brightness of an object has changed while a continuous image generated by the image capture apparatus is being displayed in an image display device such as an LCD or the like (this is called "live view" hereinafter), the stated mechanisms are used to carry out exposure control for the image sensor so as to maintain an appropriate level of exposure in the image. There are also cases where exposure control is carried out intentionally as part of the composition, such as when the depth of field is changed using the aperture value, the movement of an object is captured using the shutter speed as an element of artistic expression, and so on. Furthermore, there are cases where aperture control is carried out in order to obtain a depth of field necessary for AF, which focuses on an object.

However, when the aperture mechanism is driven for purposes and applications such as those described above, in the case where the aperture is driven during live view, while capturing moving pictures, and so on, the state occurring while the aperture is being driven will appear in the display image, resulting in a luminance fluctuation spanning approximately one or two frames. As a result, the brightness of the image in the continuous display image will increase or decrease for an instant, resulting in a problem in that the continuous image will appear unnatural.

Various proposals have been made as measures to avoid such a problem, and Japanese Patent Laid-Open No. 11-112865 (called "Patent Document 1" hereinafter) discloses fixing the aperture during live view and carrying out exposure control using only the electronic shutter. Meanwhile, Japanese Patent Laid-Open No. 9-102905 (called "Patent Document 2" hereinafter) proposes driving the aperture outside of the charge accumulation period for the image sensor.

However, in the case where the aperture is not driven during live view, as in Patent Document 1, there is a problem in that the range in which the luminance of the object is tracked is limited.

In addition, there are multiple techniques for image sensor charge accumulation and accumulated data readout. For example, there is a technique in which the accumulation start and stop times are controlled all at once for the entire sensor, as with a CCD, and a technique in which charge accumulation and readout are carried out sequentially line by line and the actual exposure times differ at the top and bottom of the image, as with a CMOS sensor.

With an image sensor structured as a CMOS sensor, how the accumulation period is to be set is an issue when driving the aperture outside of the accumulation period as in Patent Document 2. With a structure such as that of a CMOS sensor, a charge is always being accumulated in a line somewhere in the sensor, depending on the electronic shutter speed; thus it is not easy to secure a non-exposure period.

SUMMARY OF THE INVENTION

Having been achieved in light of the aforementioned problems, the present invention makes it difficult for the brightness of the image to fluctuate in a continuous image, even if aperture driving is carried out during live view, during moving picture capturing, or the like.

A first aspect of the invention is directed to an image capture apparatus that carries out exposure control by driving an aperture, the apparatus including: an image sensor, including multiple pixels, that accumulates and transfers charges per predetermined pixel group; a determination unit that determines an image region in the image sensor that serves as a region from which to output image data for recording or image data for display; and a control unit that drives the aperture within a period in which charge accumulation for the image data for recording or the image data for display is not being carried out for the pixels included in the image region determined by the determination unit.

A second aspect of the invention is directed to a control method for an image capture apparatus, the apparatus including an image sensor having multiple pixels that accumulates and transfers charges per predetermined pixel group and carrying out exposure control by driving an aperture, the method including the steps of: determining an image region in the image sensor that serves as a region from which to output image data for recording or image data for display; and driving the aperture within a period in which charge accumulation for the image data for recording or the image data for display is not being carried out for the pixels included in the image region determined in the step of determining.

Further features of the present invention will become apparent from the following description of exemplary embodiments (with reference to the attached drawings).

BRIEF DESCRIPTION OF THE DRAWINGS

FIGS. 14A through 14C are timing charts illustrating exposure operations.

DESCRIPTION OF THE EMBODIMENTS

Hereinafter, an embodiment of the present invention will be described in detail with reference to the appended drawings.

Figure 1:
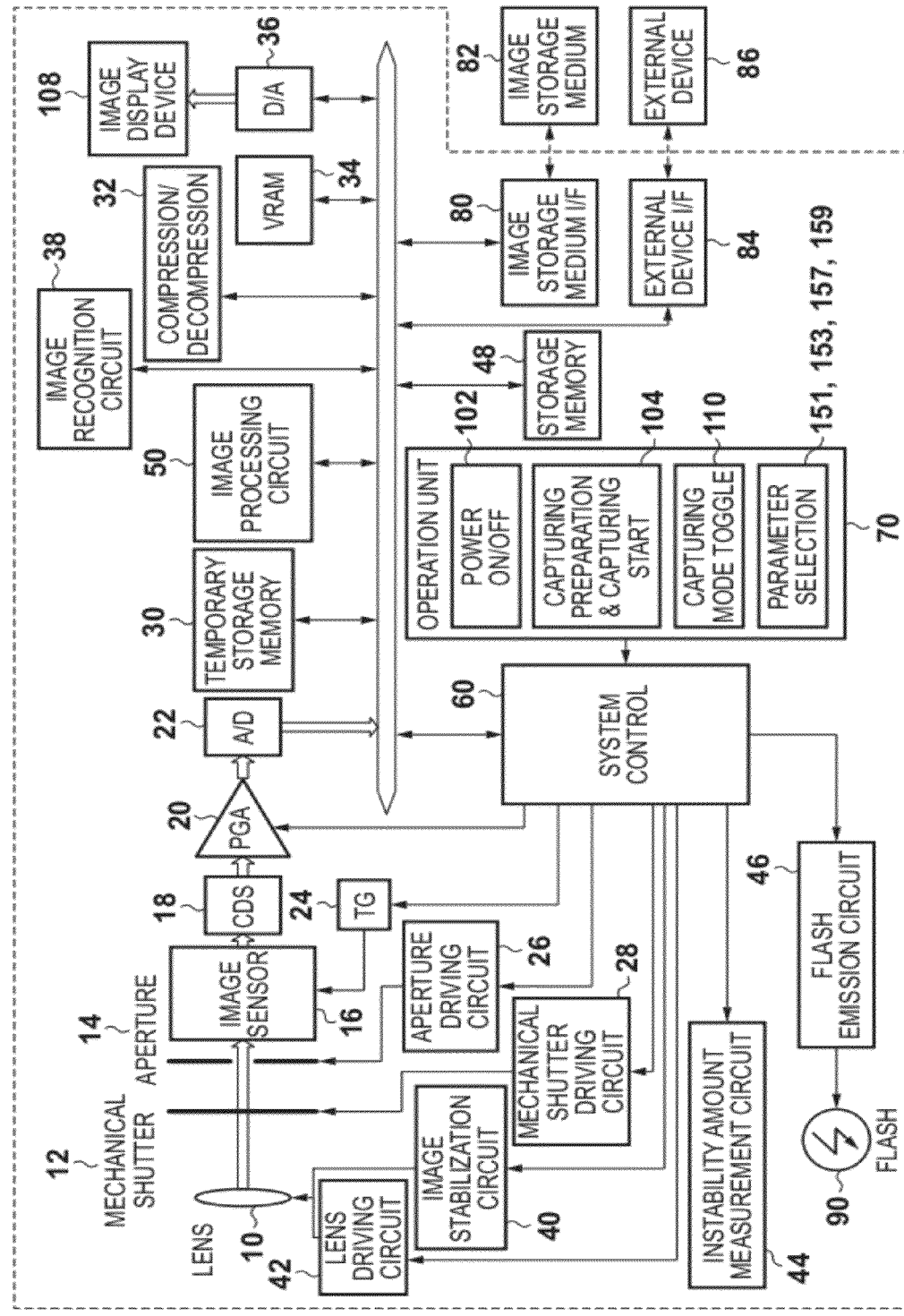
FIG. 1 is a block diagram illustrating the configuration of an image capture apparatus according to an embodiment of the present invention.

FIG. 1 is a block diagram illustrating the configuration of a camera serving as an image capture apparatus according to an embodiment of the present invention. In FIG. 1, outside light is collected by a lens 10. The focus, angle of view, and so on can be adjusted by a lens driving circuit 42 moving the lens position forward and backward along the optical axis.

Furthermore, it is possible to employ a configuration in which an image stabilization circuit 40 moves the lens based on an instability amount of the camera as measured by an instability amount measurement circuit 44, thus carrying out optical image stabilization by changing the optical axis to a direction that cancels out the instability.

The amount of the light that has passed through the lens can be adjusted by an aperture 14. A system control circuit 60 can control the aperture 14 by transmitting aperture control information to an aperture driving circuit 26. An iris type aperture, configured from multiple blades, a round aperture, in which holes having various diameters have been cut out from a plate in advance, and so on can be used as the aperture 14. Using the aperture 14 and the aperture driving circuit 26, the system control circuit 60 can control the aperture to narrow and reduce the amount of light in the case where the object luminance is high, and can control the aperture to widen and allow more light to enter in the case where the object luminance is low.

The system control circuit 60 can also control a mechanical shutter 12 by transmitting mechanical shutter control information to a mechanical shutter driving circuit 28. The exposure time during still-image capturing is determined by the opened/closed time of the mechanical shutter 12; the system control circuit 60 determines this time and issues an instruction to the mechanical shutter driving circuit 28.

Light that has passed through the lens 10, the mechanical shutter 12, and the aperture 14 is received by an image sensor 16. The system control circuit 60 can control the image sensor 16 by transmitting an image sensor control signal to a TG (Timing Generator) 24. The TG 24 drives the image sensor 16 based on the control information received from the system control circuit 60. The image sensor 16 cyclically carries out operations for exposing the sensor and reading out data resulting from the exposure, and these operations are carried out based on the driving signal from the TG 24. It is possible to read out specific lines and specific areas of the data resulting from exposure in the image sensor 16. This can be realized by changing the readout method using a readout control pulse output from the TG 24.

The system control circuit 60 determines the optimal readout method in accordance with the current state, and makes an instruction to the TG 24. For example, because a high resolution is required during still-image capturing, all of the data of the image sensor 16 is read out, whereas because a high frame rate such as 30 fps or 60 fps is required when using an electronic viewfinder or when capturing moving pictures, lines are thinned out and only specific lines are read out; in this manner, the usage is modified depending on the application. In addition, the TG 24 can also control the exposure time of the image sensor 16. This is made possible by the TG 24 issuing a driving signal to the image sensor 16 at a desired time so that the sensor releases the charges that have been accumulated.

The image data read out from the image sensor 16 passes through a CDS (correlated double sampler) circuit 18. The primary role of the CDS is to eliminate a noise component from the image data using the correlated double sampling method. Thereafter, the image data can have its level dampened/amplified using a PGA (programmable gain amplifier) circuit 20. By transmitting an amplification level to the PGA 20, the system control circuit 60 can control the amplification amount. Normally, setting the correct exposure for the image sensor 16 is realized by setting an appropriate exposure amount for the image sensor 16 using the aperture 14 and setting an appropriate exposure time using the shutter. However, by dampening/amplifying the image data signal, the PGA 20 can fulfill a role of changing the exposure of the image data in a virtual manner. It is possible to provide this as a function to a user under the concept of "sensitivity", which is one of the exposure conditions during image capturing that includes aperture and shutter speed.

The image data is converted from an analog signal to a digital signal by an A/D (analog/digital converter) circuit 22. Depending on the device, the bit size of the digital signal may be 10-bit, 12-bit, 14-bit, and so on, and an image processing circuit 50 provided in a later stage can handle multiple bit sizes. In FIG. 1, the CDS, the PGA, the A/D, and the TG are expressed as separate blocks, but it is also possible to employ a configuration in which the functions thereof are provided in a single IC package.

The digitized image data from the A/D 22 is input into the image processing circuit 50. The image processing circuit 50 is configured of multiple blocks, and implements a variety of functions.

It is typical for the image sensor 16 to extract specific color components from each pixel via a color filter. The image signal from the A/D 22 is in a data format that corresponds to the pixels of the image sensor 16 and the layout of the color filter, and is not a data format suitable for use in AE (auto exposure control), in which exposure control is carried out by evaluating only the luminance component. The image processing circuit 50 includes a function for removing color information from the image signal and extracting only luminance information. Conversely, the image processing circuit 50 also includes a function for extracting only the color information, and can therefore be used in white balance processing in which the light source color of the object is specified and the color is adjusted to an appropriate color.

Furthermore, the image processing circuit 50 includes a function for extracting only the frequency component of the signal read out from the image sensor 16, and can use this function in AF (autofocus) control.

Furthermore, the image processing circuit 50 includes a function for amplifying/damping the level of the image signal digitized by the A/D 22, manipulating color effects and the like of the image, and so on, and plays a role for adjusting the quality of the captured image. The level of the image signal can be adjusted through a function for amplifying/damping the level of the entire image using a constant amplification rate, a tone curve (gamma) function for converting the signal level based on magnitude in the original signal level, a function for amplifying/damping the level based on frequency components in individual areas within the screen, and so on.

The digitized image data from the A/D 22 can be stored in a temporary storage memory 30 at the same time as the image data is input into the image processing circuit 50. Image data that has been stored in the temporary storage memory can be read out once again, and is thus possible for the system control circuit 60 to refer to image data, input read-out image data into the image processing circuit 50, and so on. Furthermore, it is also possible to rewrite image data that has undergone processing by the image processing circuit 50 back into the temporary storage memory, and possible for the system control circuit 60 to write any given data into the temporary storage memory.

The image data that has undergone the appropriate processing in the image processing circuit 50 can be input into an image recognition circuit 38. In addition to recognizing the state of the brightness, focus, and color of the input image, the image recognition circuit 38 is also capable of recognizing the faces and expressions of people, text information in the case where text is present, and so on. Multiple images can be input into the image recognition circuit, and it is possible, for example, to input two images and determine whether or not the images are the same image by comparing the features of those two images. In addition to the method of recognizing images using the image recognition circuit, it is also possible for the system control circuit 60 to carry out an image recognition process. The system control can be carried out by a CPU executing a program that has been coded in advance, and image data that is stored in the temporary storage memory 30 can be read out by the system control circuit 60, after which the system control circuit 60 can analyze the image data and recognize the state of a scene.

In the case where the image is output to an image display device 108 such as an LCD, the image data that has been processed by the image processing circuit 50 is expanded in a VRAM 34, converted into analog data using a D/A 36, and displayed in the image display device 108. An electronic viewfinder can be implemented by displaying and updating a continuous image read out from the image sensor 16 in sequence in the image display device 108. When expanding the image data in the VRAM 34, it is possible to expand the image data in the VRAM 34 in order to handle various display states, so that a single piece of image data is displayed at the maximum size in the image display device 108, multiple images are displayed as a multi-window display, or the like.

In addition to images, any given information can be displayed alone or along with an image in the image display device 108. A display indicating the state of the camera, shutter speed or aperture values selected by the a user or determined by the camera, text information such as sensitivity information, graphs such as luminance distributions measured by the image processing circuit 50, facial recognition results, scene recognition results, and so on can be displayed. The display position and the display color of the information can be selected as desired. By displaying various types of information in this manner, it is possible to provide a user interface. In addition, it is also possible to display image data that is stored in an image storage medium 82 in the image display device 108. In the case where the image data is compressed, the image data is decompressed in a compression/decompression block 32, after which the data is expanded in the VRAM 34. This data is then converted into an analog signal by the D/A 36, and output.

The image storage medium 82 is non-volatile, and is primarily capable of storing image data that has been captured.

Figure 2:
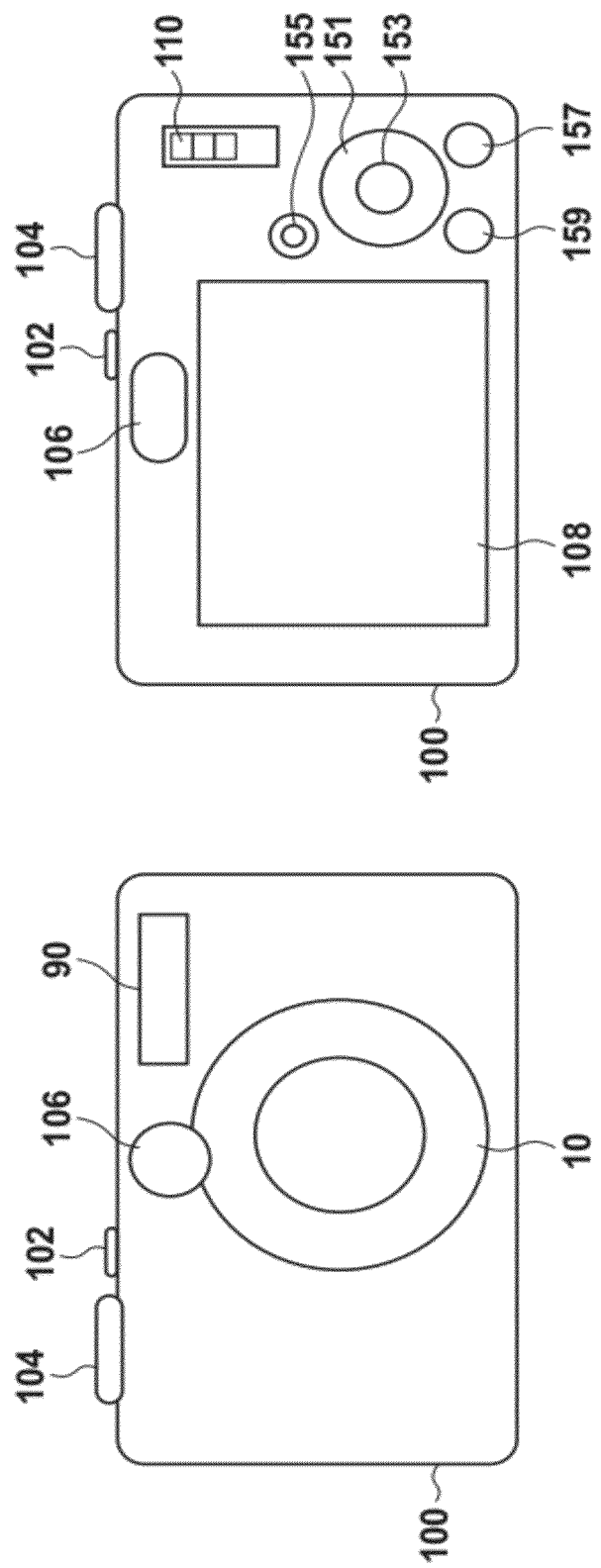
FIGS. 2A and 2B are general views of a camera.

FIGS. 2A and 2B illustrate external views of the camera. The lens 10 is disposed on the front surface of the camera, and is capable of obtaining an object image. A flash unit 90 is disposed on the same plane as the lens 10. In the case where a main object is dark, a sufficient amount of light can be obtained by causing the flash unit 90 to flash, thus making it possible to obtain a favorable image by maintaining a fast shutter speed even in dark situations. In FIGS. 2A and 2B, the lens 10 and the flash unit 90 are not limited to being disposed on the same plane; it is also possible to dispose the flash so as to face toward the upper area of the camera in order to prevent the flash light from directly illuminating the main object.

The image display device 108 is disposed on the rear surface of the camera. As described earlier, the image display device 108 can display text information, graphs, icons, and so on in addition to images, and is therefore an important member that also functions as an interface for the user. In recent years, EVFs (electric viewfinders) have become mainstream in digital cameras, and thus an object can be captured by referring to a continuous image output in the image display device 108; thus the image display device 108 functions as a viewfinder. At this time, it is also possible to display light measurement area information and distance measurement area information for AE and AF so as to overlap with the object image. Furthermore, it is also possible to display a frame indicating the result of recognizing the face of a person over the face of that person as an object recognition status, and to display icons resulting from recognizing the background scene, such as a blue sky, a sunset, back light, and so on. A configuration in which an optical viewfinder 106, as used in the past, is also provided can be employed as well.

A capturing mode toggle switch 110 makes it possible to switch among camera operation modes, such as a still image capturing mode, a moving picture capturing mode, a playback mode, and so on. Although the capturing mode toggle switch 110 is implemented as a member that is capable of switching among several modes in FIGS. 2A and 2B, it is also possible to provide many still image modes that are optimized for specific scenes that are to be captured, such as a landscape capturing mode, a person capturing mode, and so on.

Using parameter selection switches 151, 153, 155, 157, and 159, it is possible to select capturing conditions employed when capturing images, such as a distance measurement area and a light measuring mode, and it is also possible for the user to move through pages when playing back captured images, perform overall camera operation settings, and so on. It is also possible to turn the aforementioned electronic viewfinder on and off. Alternatively, a configuration in which the image display device 108 not only displays images but also serves as an input device using a touch panel may also be employed.

A release button 104 for instructing the start of capturing preparation operations and instructing the start of capturing operations is disposed in an upper area of the camera. Although the release button 104 is a single operation member, the release button 104 is capable of realizing two-step depression operations, for the case where the button is lightly depressed (a SW1 is operated) and when the button is fully depressed (a SW2 is operated). In the case of a camera that carries out automatic exposure control, automatic focus control, or the like, the automatic exposure control and focus control are carried out as the capturing preparation operations when the release button 104 is lightly depressed, whereas operations for capturing a still image, moving picture, or the like are carried out when the release button 104 is fully depressed.

The automatic exposure control operates so that a favorable exposure is obtained in the capturing mode selected by the capturing mode toggle switch 110. The capturing modes include modes that are specialized for specific objects, such as a portrait mode, a landscape mode, a night scene mode, as well as generic modes such as an auto mode and so on. There are also modes in which the user instructs the shutter speed, aperture value, and so on to be used during capturing in advance, such as a shutter speed priority mode, an aperture priority mode, and so on. In these modes, it is possible to automatically select and set a favorable capturing sensitivity to be set in the PGA 20, and possible for the user to instruct a sensitivity in advance. When the user instructs the sensitivity in advance, the S/N of the image signal drops as the capturing sensitivity increases; it can thus be assumed that a user who wishes to prioritize image quality will select a low sensitivity. Meanwhile, the operations of the AF control can be switched so that a favorable focus can be obtained for each of the capturing modes.

Figure 3:
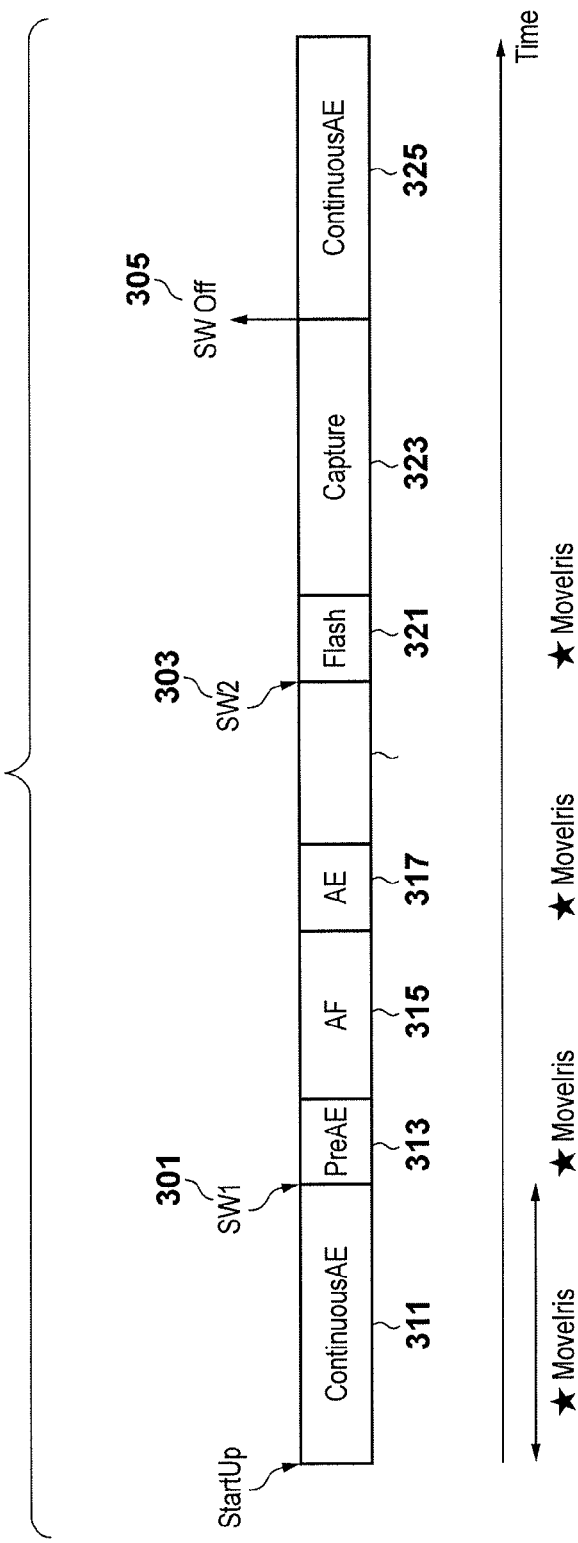
FIG. 3 is a diagram illustrating an operation sequence of a camera.

FIG. 3 illustrates a sequence carried out in a camera 100 configured as described thus far; this sequence spans from when live view is being carried out to when a still image is captured after the camera has been started up.

After the camera has been started up, ContinuousAE 311, in which the exposure is continually adjusted to a proper exposure, is carried out in order to display a continuous image in the image display device 108 (that is, in order to carry out live view). The ContinuousAE 311 operates by adjusting the aperture, electronic shutter, and so on in accordance with the object luminance in order to obtain a correct exposure.

Figure 4A:
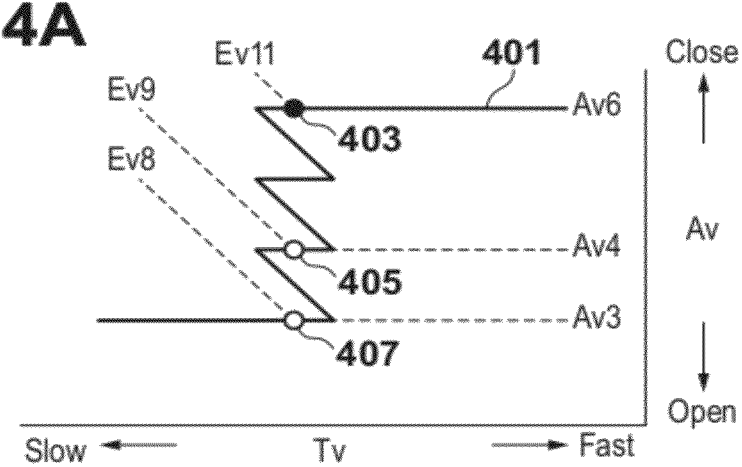
FIGS. 4A through 4C are diagrams illustrating program line charts for exposure control.

At this time, the exposure is determined based on the program line chart shown in FIG. 4A. In the program line chart in FIG. 4A, the aperture value is represented by the vertical axis and the shutter speed is represented by the horizontal axis; if the object luminance becomes higher, the aperture is set to Close and the shutter speed to Fast, whereas if the object luminance becomes lower, the aperture is set to Open and the shutter speed to Slow. The program line chart in FIG. 4A illustrates an example in which the aperture value is changed step by step, and thus in the case where an exposure value Ev, which is a value corresponding to the object luminance, has changed from, for example, Ev 8 to Ev 9, the aperture is driven from Av 3 to Av 4. Meanwhile, in the case where Ev has changed from, for example, Ev 8 to Ev 11, the aperture is driven from Av 3 to Av 6. In the case where a change in the object luminance from Ev 8 to Ev 11 is tracked, the exposure may be changed gradually, taking into consideration the appearance of the image displayed in the live view; in this case, the aperture is driven three times, from Av 3 to Av 4, from Av 4 to Av 5, and from Av 5 to Av 6. Although FIG. 4A illustrates a program line chart in which the aperture can be controlled in multiple steps as an example of an iris-type aperture mechanism, it should be noted that in the case where the aperture mechanism can only be controlled in two steps, or open and low-aperture, the line chart illustrates only a single instance of aperture driving regardless of the amount of change in the object luminance.

Figure 4B:
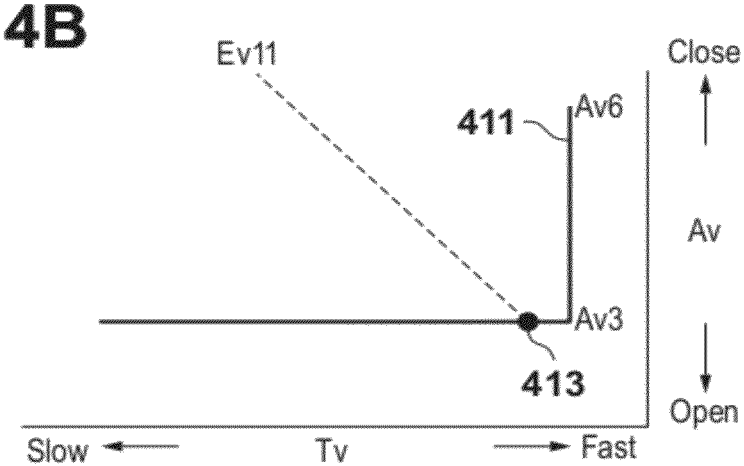

In the case where the SW1 button of the camera has been depressed, the operation of the SW1 in FIG. 3 (301) is detected and processes for adjusting the exposure and the focus of the object are carried out as preparations for still image capturing. In a PreAE (313), the object luminance is measured, and processing is carried out to control the aperture value to a value that is suited to the AF (315) carried out thereafter. The depth of field is related to the aperture diameter, and thus the depth is reduced when the aperture is opened and the depth is increased when the aperture is reduced. Because it is necessary to focus more precisely on the object as the depth of field decreases, the aperture is opened to a degree at which the object depth is as low as possible in order to carry out the AF (315). Doing so makes it possible to maintain a state in which the object is in focus, even if the aperture is changed in order to carry out exposure control for still image shooting. A program line chart for the AF (315) is shown in FIG. 4B; assuming that an open aperture is used as default, the line chart shows the aperture beginning to narrow in the case where the object luminance has increased and the shutter speed limit has been reached. For example, in the case where the Ev is Ev 11, the Av is Av 6 according to the program line chart for ContinuousAE shown in FIG. 4A, whereas the Av is Av 3 according to the program line chart for AF shown in FIG. 4B. In other words, the aperture is driven according to the switching in this line chart even if the object luminance does not change.

Figure 4C:
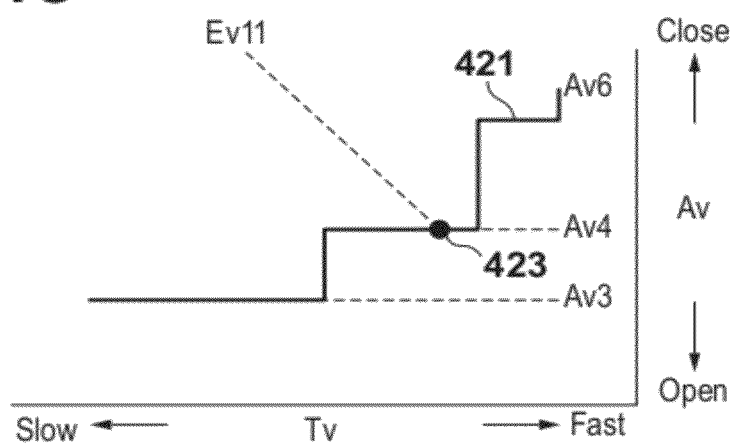

After the AF (315), AE (317) for determining the exposure for still image capturing is carried out. There are various methods that can be used for the exposure for still image capturing; multiple program line charts set in advance for each capturing mode can be used, or in the case where the user can specify desired aperture values and shutter speeds, the specified value can be used in the still image capturing regardless of the program line chart. FIG. 4C illustrates a program line chart for a given capturing mode. The program line chart is determined based on various concepts, such as a program line chart that emphasizes image quality by extensively using aperture values in which the resolution is at its highest during still image capturing, extensively using fast shutter speeds in order to prevent blurring, and so on. For example, in the case where the Ev is Ev 11, the Av becomes Av 3 according to the program line chart for AF illustrated in FIG. 4B, whereas the Av becomes Av 4 according to the program line chart for still image capturing in FIG. 4C. In other words, the aperture is driven according to the switching in this line chart even if the object luminance does not change.

In the sequence illustrated in FIG. 3, the aperture value for still image capturing is controlled at the point in time corresponding to AE (317), and the time lag resulting from the driving of the aperture when the SW2 operates (303) is reduced. However, if the speed involved in the aperture driving is sufficiently high, the sequence may control the aperture value used in the still image capturing after SW2 has been operated.

The still image capturing is carried out after the SW2 operation 303; however, in the case where a flash is emitted as a result of capturing carried out using the flash, a flash adjustment process 321, for determining the appropriate amount of flash light, is carried out prior to the capturing. In the case where, for example, it is determined that the object is at a close distance or the object has a high reflectance as a result of the adjustment process, there are cases where it is highly likely that blooming will arise even if the minimum flash amount is set. There are cases where the aperture value is further reduced beyond the value determined in the AE 317 as a measure against such blooming. If the opening radius is reduced and the amount of light that enters into the image sensor is suppressed, blooming can also be suppressed.

In this manner, aperture driving occurs in various areas in the sequence shown in FIG. 3. However, in the case where the aperture is driven while a continuous image is being generated, as is the case during live view or moving picture capturing, there are cases where the state occurring during the aperture driving will appear in the image and the brightness of the image will fluctuate in the continuous image as a result.

Figure 5:
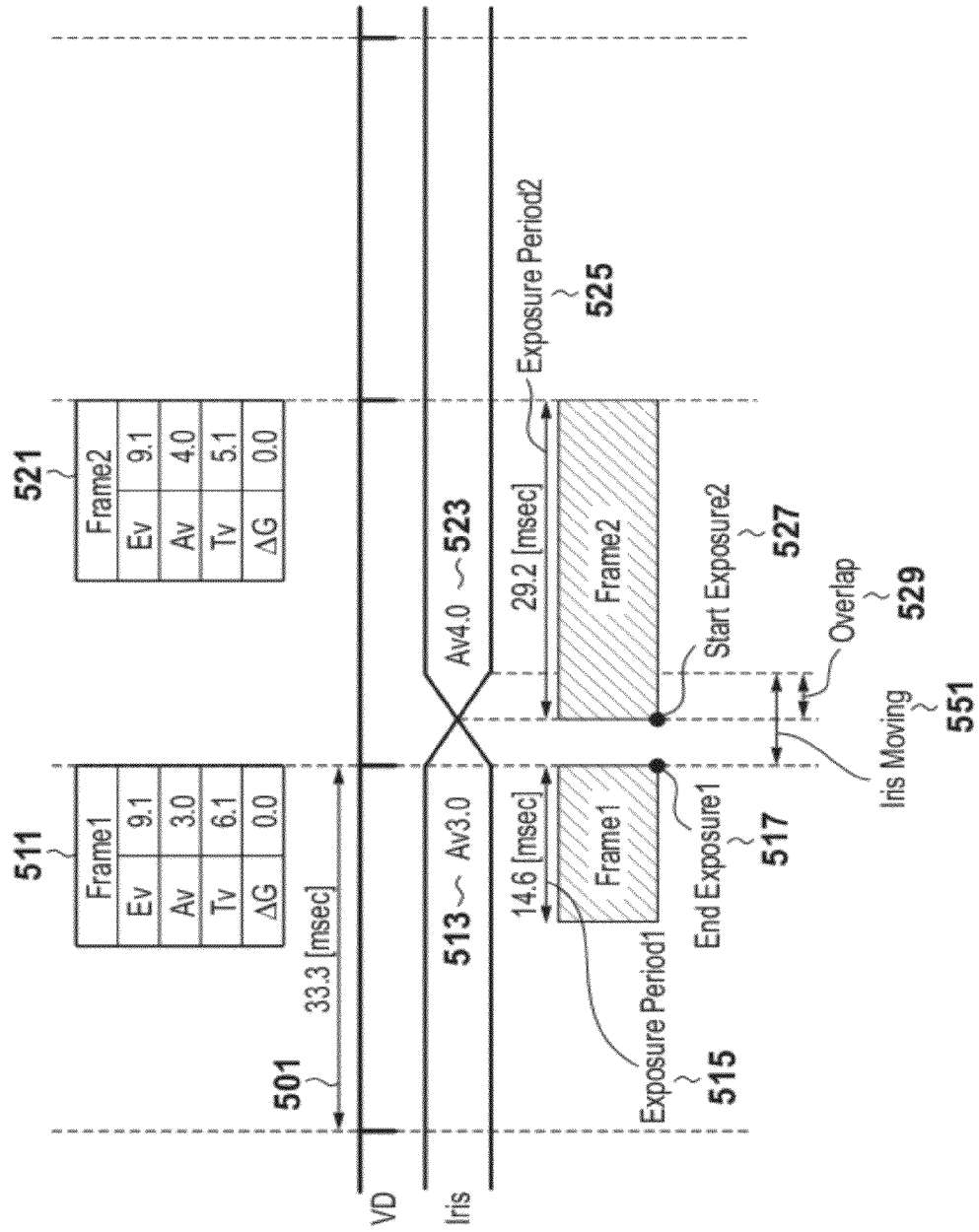
FIG. 5 is a timing chart illustrating the occurrence of luminance fluctuations in a CCD.

FIG. 5 illustrates an example of aperture driving in the case where a CCD is provided as the image sensor. FIG. 5 illustrates an example of control carried out so as to change the combination of the aperture and the shutter speed, while maintaining the exposure value Ev between a Frame1 (511) and a Frame2 (521). Up until Frame1, Ev 9.1=Av 3.0+Tv 6.1 -ΔGain 0.0; control is thus carried out so that the aperture is narrowed by one step and the shutter speed is reduced by one step, so that in Frame2, Ev 9.1=Av 4.0+Tv 5.1–ΔGain 0.0. The cycle (501) of a vertical synchronization signal VD of the image sensor is set to 33.3 msec.

An advantage of a CCD is that the structure for exposure time control makes it possible to specify the timings at which exposure is started and stopped all at once in the image sensor, and thus no differences arise between the actual exposure times in a single image. The shutter speed in Frame1 is Tv 6.1, which is approximately 14.6 msec; the exposure is started from the vicinity of the middle of the vertical synchronization period, and is ended in the vicinity of the next VD signal. Meanwhile, the shutter speed in Frame2 is Tv 5.2, which is approximately 29.2 msec; thus exposure is being carried out during almost the entire vertical synchronization period. However, although small, a non-exposure period is present between Frame1 and Frame2, and if the aperture driving can be completed during this non-exposure period, a desired exposure can be obtained in both Frame1 and Frame2.

In FIG. 5, in order to carry out aperture during the non-exposure period, driving of the aperture from Av 3.0 toward Av 4.0 is commenced from EndExposure1 (517), which indicates the end of the exposure in Frame1. However, an aperture driving period IrisMoving (551), which is the time involved in the aperture driving, is longer than the non-exposure period, and thus the exposure of the next Frame2 will be started during the aperture driving. Due to Overlap (529), which is a period in which the aperture driving and the exposure in the Frame2 overlap, the exposure in Frame2 will not conform to the desired exposure, and overexposure will occur by an amount equivalent to the time taken before the Av reaches 4.0.

With a CCD, it is easy to make corrections in the case where a luminance fluctuation has occurred in a desired exposure due to overlap of the aperture driving and exposure in this manner. Because a CCD is capable of controlling the timing of the start of exposure and the end of exposure at once, if the luminance fluctuation occurs in the entire screen and there is a slight overexposure, the shutter speed is increased by that amount in Frame2; increasing the shutter speed in this manner makes it possible to cancel out the amount of overexposure. It is also possible to make the same type of correction by adjusting the gain. However, with an image sensor such as a CMOS sensor, in which the structure is such that charges are accumulated and read out in line units and differences in the actual exposure times arise between the upper and lower sections of the image, it is difficult to correct the amount of exposure fluctuation in the same manner as with a CCD.

Figure 6:
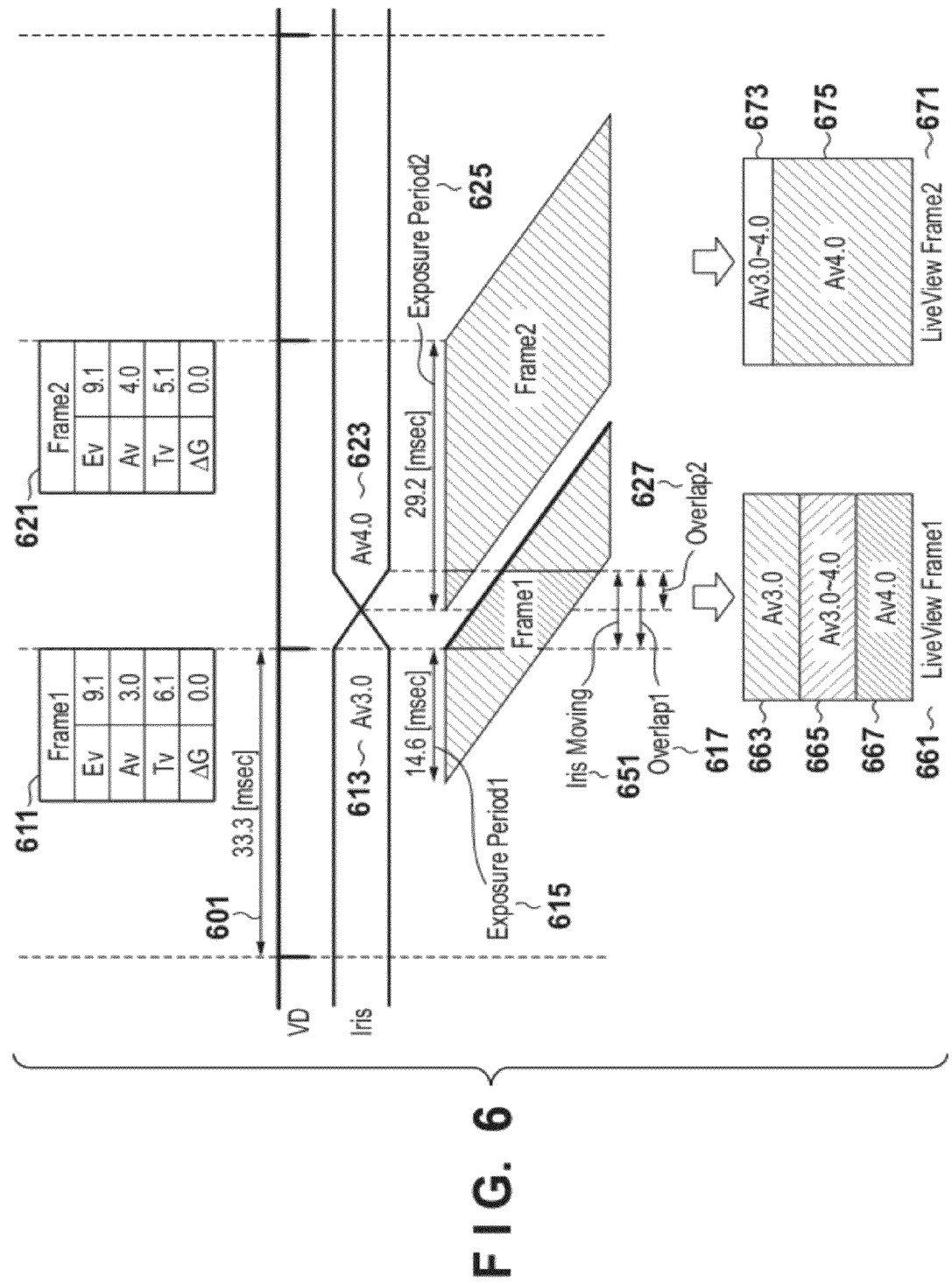
FIG. 6 is a timing chart illustrating the occurrence of luminance fluctuations in a CMOS sensor.

FIG. 6 illustrates an example of aperture driving in the case where a CMOS sensor is provided in the image sensor. As in FIG. 5, FIG. 6 illustrates the state of control in which Ev 9.1=Av 3.0+Tv 6.1–ΔGain 0.0 in Frame1 (611) is controlled to Ev 9.1=Av 4.0+Tv 5.1–ΔGain 0.0 in Frame2 (621). The cycle (601) of the vertical synchronization signal VD of the image sensor is, as in FIG. 5, set to 33.3 msec.

The CMOS sensor has a structure in which the timings at which exposure is started and ended can be controlled in units of single lines (pixel group units) in the horizontal direction from among the pixels disposed in the image sensor, and thus the actual exposure times in a single screen differ from line to line. To illustrate this state, FIG. 6 shows the state of exposure as parallelograms; here, the lines in the upper portion of the screen are exposed first, and the lines that are in the lower portion of the screen are exposed in sequence thereafter.

With such a CMOS structure, in the case where the aperture is controlled from Av 3.0 to Av 4.0 in the same manner as a CCD, the aperture value will begin to change during the exposure in Frame1, and thus Overlap1 (617), which is a period in which the exposure and the aperture driving overlap, will result.

Although Frame1 should be exposed at Av 3.0, the Av is not 3.0 starting with the start of the overlap of the aperture driving, and is 4.0 by the time the exposure has ended. In Frame2 as well, the aperture driving is still being carried out when the exposure of the upper portion of the screen is being carried out; this corresponds to Overlap2 (627), which is a period in which the exposure and the aperture driving overlap. Accordingly, the aperture value in this line does not reach the desired Av 4.0, and thus a luminance difference arises within the screen (within the image region).

As can be seen from the display image (661) generated from Frame1, the desired Av in the upper portion of the screen is 3.0 however, the aperture driving from Av 3.0 to Av 4.0 starts partway through, and the Av becomes 4.0 across the lower portion of the screen. Furthermore, as can be seen from the display image (671) generated from Frame2, the upper portion of the screen is still undergoing aperture driving from Av 3.0 to Av 4.0.

In this manner, in a CMOS sensor, the desired aperture value cannot be obtained across two frames when carrying out exposure control in the same manner as with the CCD as shown in FIG. 5, and thus luminance fluctuations occur in the generated image. Furthermore, because a luminance difference arises within the screen, a method for correcting the exposure in the screen as a whole cannot be used in the same manner as with a CCD, and thus correction is difficult.

As described above, it is difficult, with a CMOS sensor, to correct the luminance fluctuation after the fluctuation has occurred due to the aperture driving carried out during exposure, and thus it is necessary to ensure, to the greatest extent possible, that the exposure and the aperture control do not overlap.

FIGS. 14A through 14C are diagrams illustrating relationships between pixels disposed in the image sensor and areas that are output as images.

FIG. 14A illustrates a state in which the aspect ratio (horizontal to vertical ratio) of the image is 4:3; FIG. 14B illustrates a state in which the aspect ratio of the image is 16:9; and FIG. 14C illustrates a state in which digital zoom (a digital zoom setting) has been carried out, cutting out and narrowing an area of an image whose aspect ratio is 4:3. Incidentally, the image whose aspect ratio is 16:9 in FIG. 14B is an example in which the size in the horizontal direction is the same as in a 4:3 but the image area has been reduced in the vertical direction.

An area to output image data for recording or image data for display (that is, an image area) is set for all of the pixels (1401) disposed in the image sensor, in accordance with the aspect ratio (aspect ratio setting), the digital zoom factor, and so on. The aspect ratio (aspect ratio setting) and digital zoom factor can be set by manipulating the parameter selection switches 151, 153, or the like. In the case where the aspect ratio is 4:3, as in FIG. 14A, the pixels within an area (1411) that starts from Line2 are taken as the image area; meanwhile, in the case where the aspect ratio is 16:9, as in FIG. 14B, the pixels within an area (1421) that starts from Line4 are taken as the image area. Meanwhile, in the case where digital zooming has been carried out with the aspect ratio at 4:3, as shown in FIG. 14C, the pixels in an area (1431) that starts from Line5 are taken as the image area; when further digital zooming is carried out, the image area narrows with the aspect ratio maintained at 4:3, and thus the area narrows in the horizontal direction as well.

In FIGS. 14A, 14B, and 14C, it is not necessarily the case that all of the signals of the pixels (pixel signals) disposed in the image sensor are output as images, and there are areas in the top and bottom of the screen and the left and right of the screen that do not serve as images. Areas in which the light has been blocked are also present in these areas that do not serve as images; these areas are used as pixels for obtaining a reference black level necessary when generating images.

In a CMOS sensor, the start and end of exposure accumulation in the pixels disposed in this manner is controlled in line units. For this reason, as indicated by the timing charts in FIGS. 14A through 14C, the start of accumulation is carried out sequentially in line units relative to the vertical synchronization signal VD, so that the accumulation starts for Line0, then Line1, and so on. The transfer of the accumulated data is also carried out sequentially, so that the transfer starts for Line0, then Line1, and so on. As a result, ExposureTime (1403), which is the charge accumulation period for each line, and ReadTime (1405), which is the transfer time, are expressed as a drawing of a parallelogram.

The areas in the images expressed as parallelograms that are further shaded indicate image areas ImageArea (1411), (1421), and (1431). The necessary exposure periods TotalExposureTime (1415), (1425), and (1435), which indicate the amount of time from when the exposure of the first line output as the image starts until the exposure of the last line ends, differ depending on the number of lines output as the image. As shown in FIGS. 14A through 14C, the necessary exposure period becomes longer the greater the number of lines that serve as the image area is.

In other words, even if the cycle of the vertical synchronization signal VD and the shutter speed is the same, the length of the period for which the image area is exposed during the vertical synchronization period and the length of the non-exposure period will differ depending on the aspect ratio settings, the digital zoom settings, and so on. In other words, when an attempt is made to carry out aperture driving during the non-exposure period, it is always important to consider where the image area is.

Figure 7:
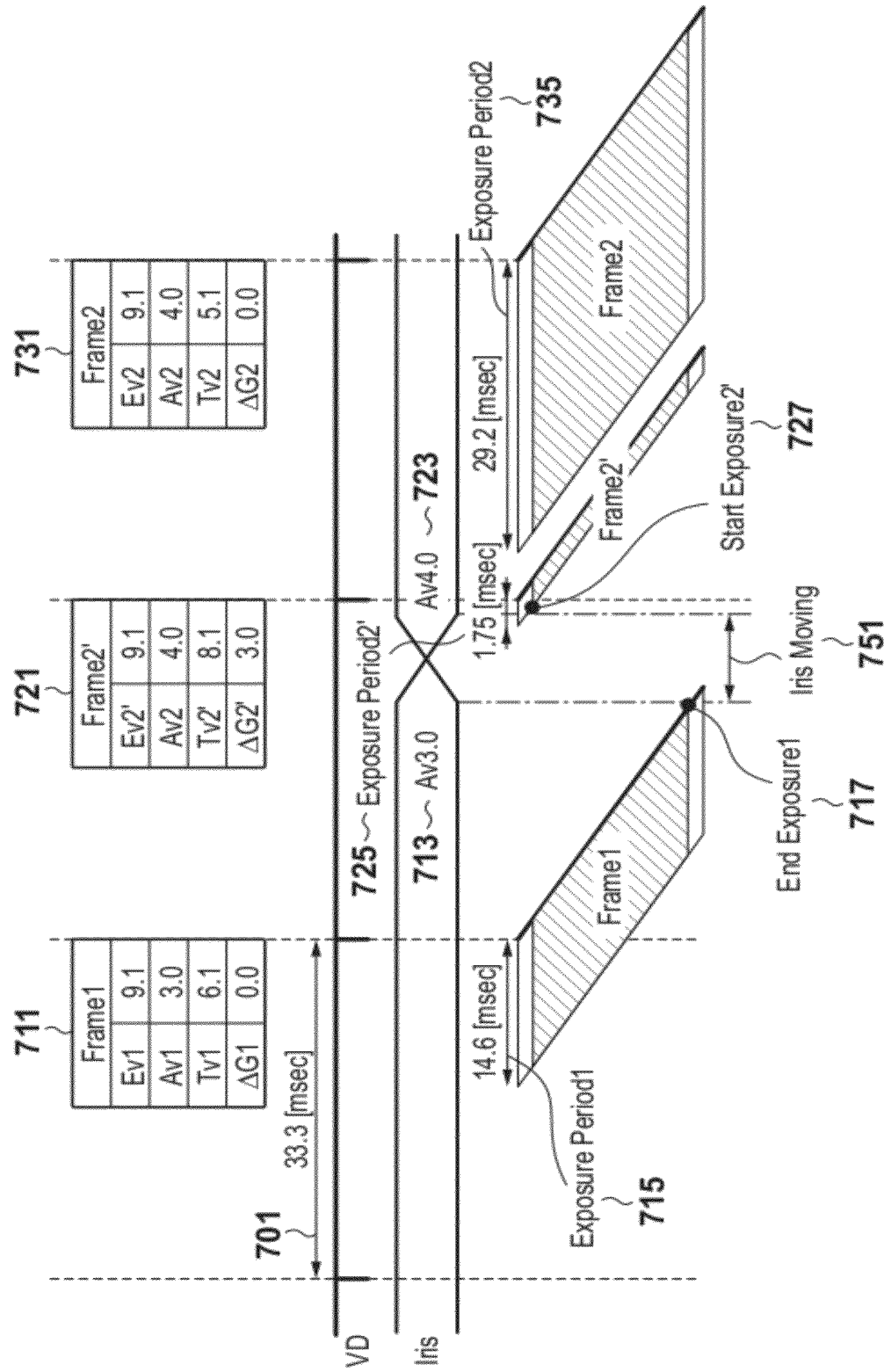
FIG. 7 is a timing chart illustrating measures taken for luminance fluctuations.

Like FIG. 6, FIG. 7 illustrates a case in which aperture driving is carried out while maintaining the non-exposure period having taken into consideration the image area, when carrying out control from Ev 9.1=Av 3.0+Tv 6.1−ΔGain 0.0 in Frame1 to Ev 9.1=Av 4.0+Tv 5.1−ΔGain 0.0 in Frame2. Note that in FIG. 7, the aspect ratio is set to 4:3, as in FIG. 14A.

In FIG. 6, the shutter speed is immediately controlled from Tv 6.1 in Frame1 (611) to a shutter speed Tv 5.1 in Frame2 (621), and aperture driving is carried out while exposure for both Frame1 and Frame2 is being performed. As opposed to this, in FIG. 7, in which the present invention is applied, an aperture driving Frame2' (721) is provided between Frame1 (711) and Frame2 (731). The aperture driving Frame2' has a higher shutter speed than the shutter speed Tv 5.1 in Frame2 (621). In other words, accumulation time control is carried out so that the charge accumulation period in the Frame2' is shorter. By doing so, the non-exposure period is maintained during the period spanning from the end of the exposure EndExposure1 (717) of the last line of Frame1 to the start of the exposure StartExposure2' (727) of the first line in Frame2'.

Specifically, by increasing the shutter speed to Tv 8.1, an aperture driving required time IrisMoving (751) is secured, and the aperture driving can be carried out in the non-exposure period by starting the aperture driving in response to EndExposure1 (717). At this time, although the shutter speed in Frame2 is Tv 5.1, the third step is set to a faster Tv 8.1; if such is the case, underexposure will occur by that amount. This underexposure is corrected by increasing the gain ΔG by three steps, so that Ev 9.1 is maintained. After the aperture driving has been carried out in this manner, control is carried out in the next frame after Frame2' so as to obtain the original target exposure Tv 5.1 and ΔG 0.0. In this manner, by increasing the shutter speed before moving to the target exposure and providing a non-exposure period in which aperture driving can be carried out, the aperture can be controlled from Av 3.0 to Av 4.0 in a state in which there is stable exposure in the sequential frames Frame1, Frame2', and Frame2.

Figure 8:
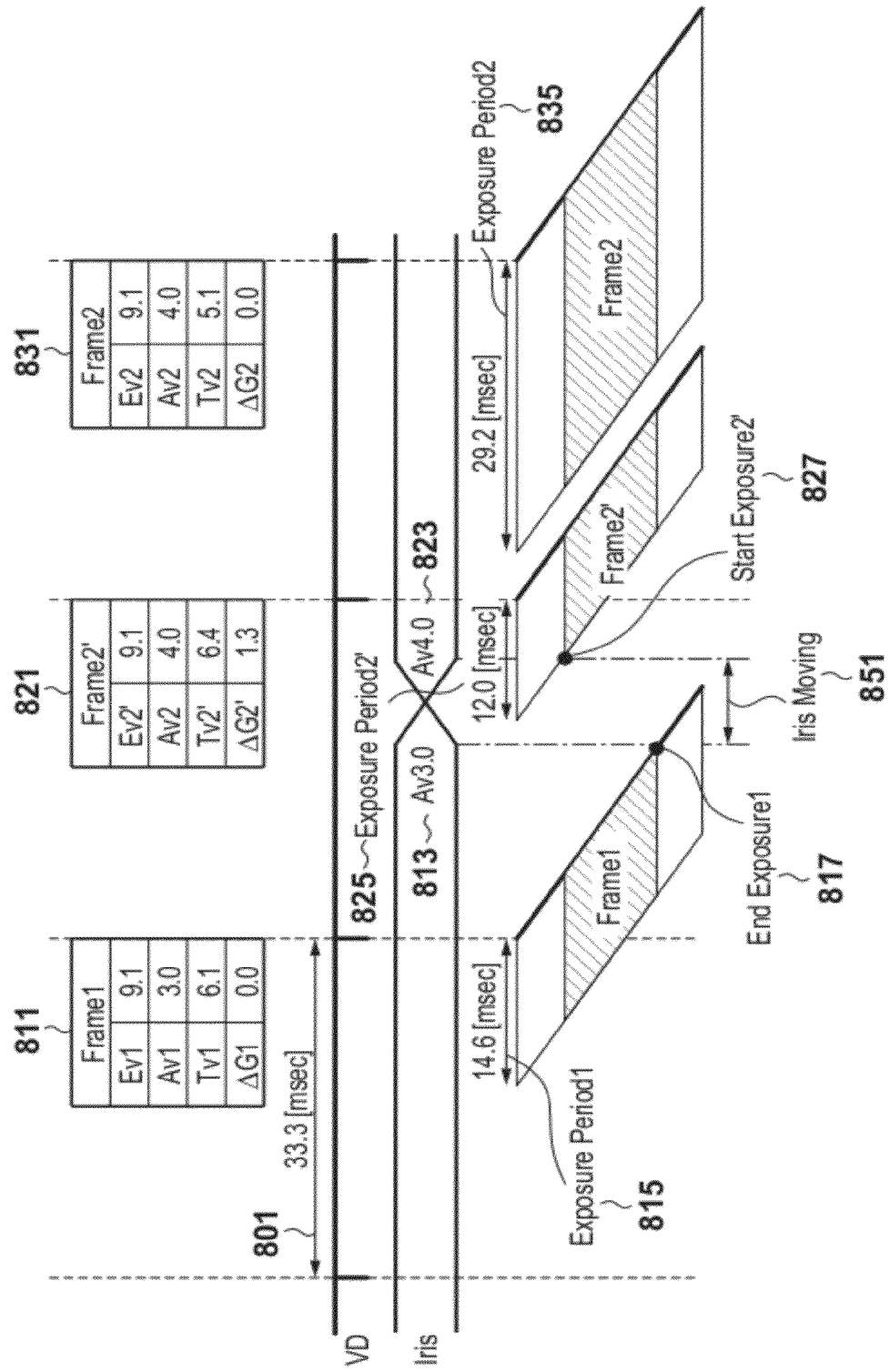
FIG. 8 is a timing chart illustrating measures taken for luminance fluctuations.

Next, FIG. 8 is a diagram illustrating a timing for a case where fewer lines than when the aspect ratio is 4:3, as shown in FIG. 7, are output as the image, such as the case where the aspect ratio is 16:9, digital zooming is being carried out, and so on. As in FIG. 7, it is assumed that for Frame1 (811) and Frame2 (831), control is carried out from Ev 9.1=Av 3.0+Tv 6.1−ΔGain 0.0 in Frame1 to Ev 9.1=Av 4.0+Tv 5.1−ΔGain 0.0 in Frame2.

In the case where fewer lines are output as the image due to the aspect ratio, digital zooming, or the like, the end of the exposure EndExposure1 (817) of the final line output as the image comes sooner. For this reason, as shown in FIG. 8, if an attempt is made to carry out the aperture driving in the non-exposure period, it is possible to start the aperture driving faster than in FIG. 7. Furthermore, the aperture driving to Av 4.0 ends earlier than in FIG. 7, and thus it is possible to start the exposure of the first line in Frame2' earlier as well. In other words, this means that the shutter speed required to secure the non-exposure period can be set to a lower speed than in FIG. 7, which also reduces the amount by which the gain is increased due to the increase in the shutter speed. Because an increase in gain leads to a drop in the image quality caused by a drop in the S/N, it is desirable to keep an increase in gain to a minimum.

For this reason, although the exposure change from Frame1 to Frame2 is exactly the same in FIGS. 7 and 8, the optimal shutter speed and optimal gain increase amount in Frame2' differ depending on the settings for the aspect ratio, the digital zooming, and so on. Comparing FIGS. 7 and 8, it can be seen that the gain increase amount in Frame2' is lower in FIG. 8, and thus the image quality in the sequential Frame1, Frame2', and Frame2 is more stable in FIG. 8; this makes it possible to display a favorable image.

Figure 9:
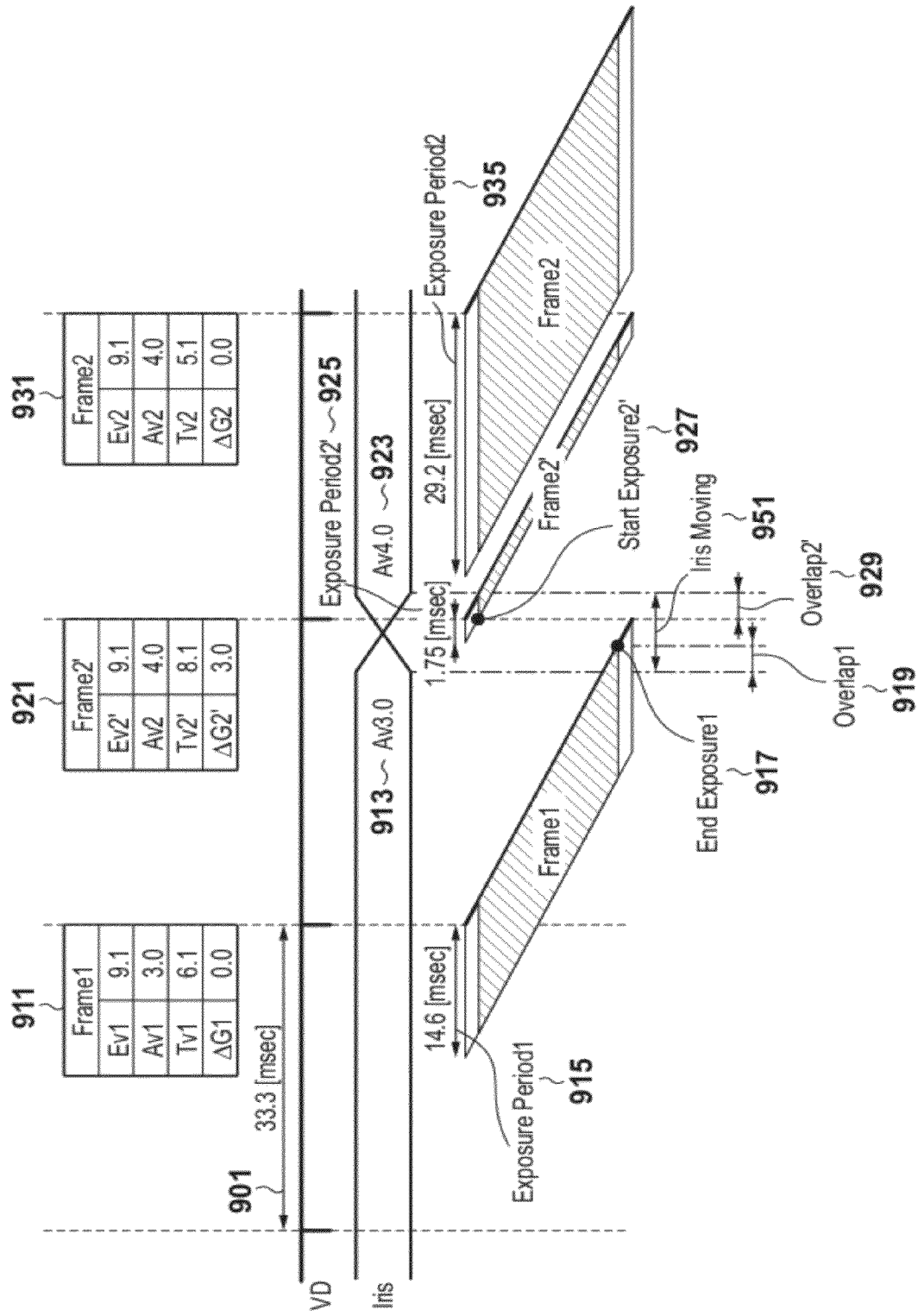
FIG. 9 is a timing chart illustrating a case in which measures for luminance fluctuations cannot be taken.

FIGS. 7 and 8 have illustrated examples in which the non-exposure period is secured by increasing the shutter speed and the aperture driving can be carried out in the non-exposure period; FIG. 9, however, illustrates an example in which the non-exposure period cannot be secured even if the shutter speed is increased.

When the exposure of the lines to be output as images ends in the vertical synchronization period differs depending not only on the aspect ratio and digital zoom settings, but also on a variety of other elements, such as the image sensor driving clock frequency, the number of pixels to be read out from the image sensor, hardware specifications such as the cycle of the vertical synchronization signal VD, and so on.

FIG. 9 is, like FIG. 7, a timing chart for the case where the aspect ratio is 4:3, and the exposures of Frame1, Frame2', and Frame2, the number of pixels read out from the image sensor, and the cycle of the vertical synchronization signal VD are the same as well. However, the image sensor driving clock frequency has been lowered, and thus the time required to read out a single pixel is longer. Because a longer time is required for the readout of a single pixel, it can be seen that the readout shape for a single frame in FIG. 9 is a parallelogram that is more skewed to the side.

It can be seen that the timing of the end of exposure EndExposure1 (917) of the final line in Frame1 in FIG. 9 is relatively later than that in FIG. 7 and is approaching the start of exposure StartExposure2' (927) of the first line in the next Frame2'. Thus it can be seen that there is a difference in the non-exposure period that can be secured in FIGS. 7 and 9, regardless of the fact that the shutter speed in Frame2' is the same Tv 8.1. As such, the time required for aperture driving IrisMoving (951) cannot be secured, and thus regardless of the aperture driving timing, the aperture driving cannot be carried out in the non-exposure period without overlapping with the exposure period. FIG. 9 illustrates a state in which an overlap period Overlap1 (919) is present in the lower portion of Frame1 and an overlap period Overlap2' (929) is present in the upper portion of Frame2'.

Figure 10:
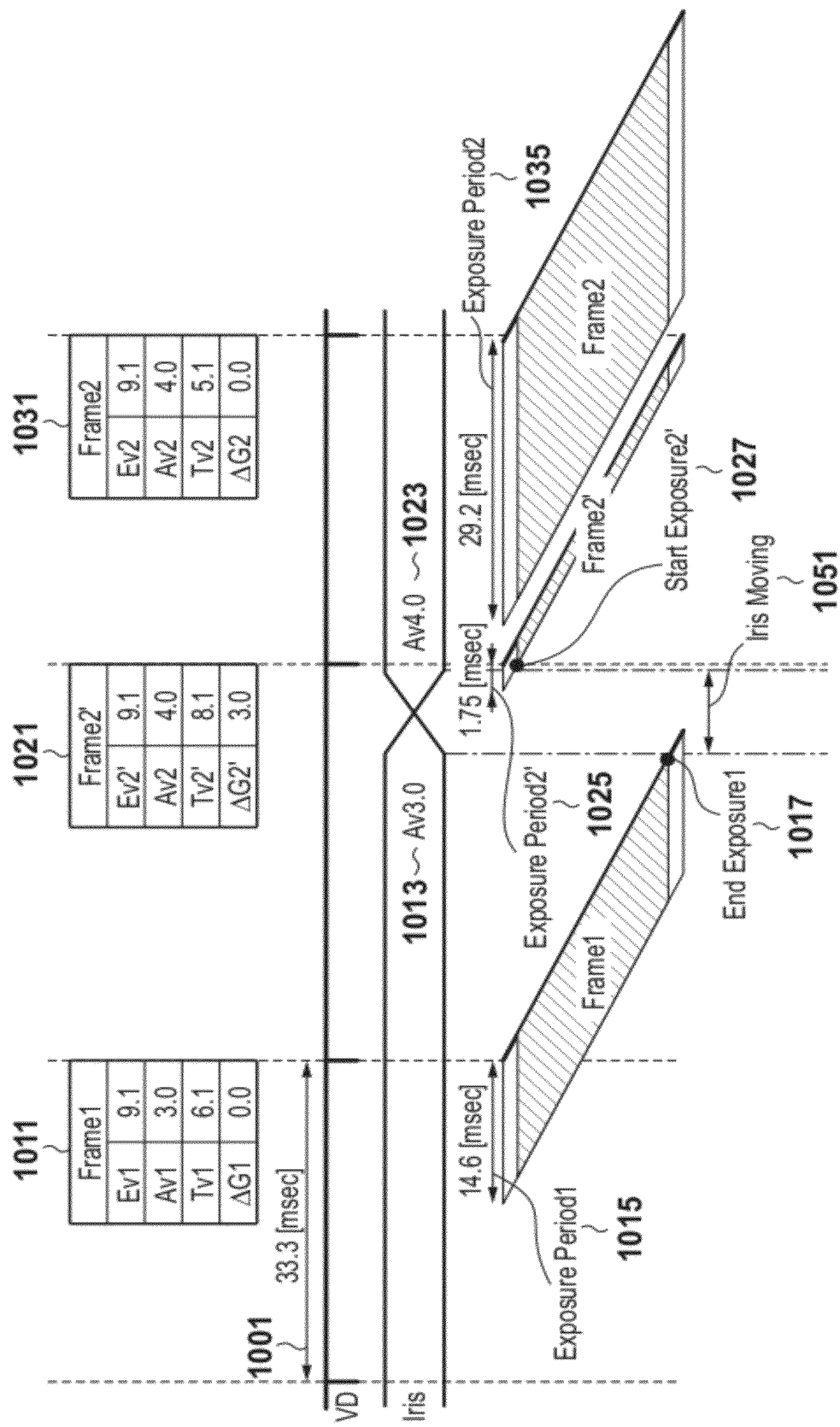
FIG. 10 is a timing chart illustrating measures taken for luminance fluctuations.

FIG. 10 illustrates a state in which, in the case where it is difficult to secure the non-exposure period by increasing the shutter speed, the non-exposure period is secured by lengthening the cycle of the vertical synchronization signal VD.

In FIG. 10, the cycle of the vertical synchronization signal VD is lengthened to make it possible to secure the non-exposure period required during the period from EndExposure1 (1017) of Frame1 to StartExposure2' (1027) in Frame2'. In other words, compared to FIG. 9, the vertical synchronization period in which the aperture driving is carried out is lengthened in FIG. 10. Accordingly, StartExposure2' (1027) in Frame2' is delayed, thus securing a sufficient non-exposure period in IrisMoving (1051).

Although this method can be applied in the case where the specifications on the cycle of the vertical synchronization signal are not stringent, such as when live view is being carried out, it should be noted that when, for example, capturing moving pictures in the NTSC format, it is necessary to maintain a cycle of 29.97 fps, and thus the method of lengthening the cycle is not suitable.

In the case where it is not possible to lengthen the cycle of the vertical synchronization signal as illustrated in FIG. 10 and it is therefore difficult to secure a sufficient non-exposure period, the aperture driving and the exposure period will overlap regardless of the timing of the aperture driving. However, due to the state of the aperture driving, there are cases where, depending on the captured scene, a luminance fluctuation is not apparent even if the luminance fluctuation occurs in a given line.

Figure 11A:
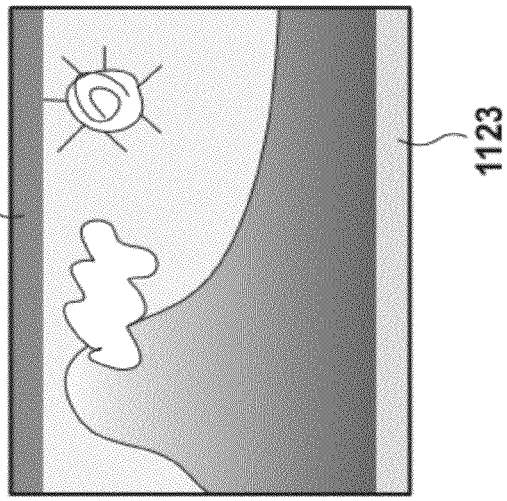
FIGS. 11A through 11C are diagrams illustrating examples of scenes.
Figure 11B:
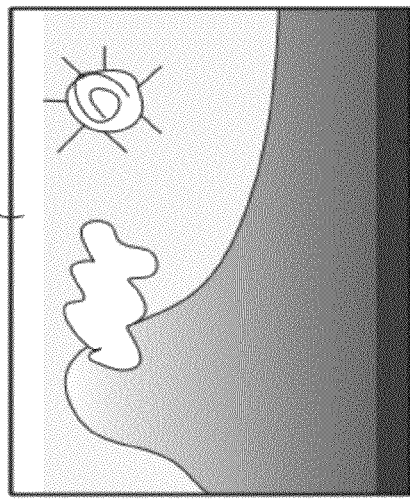
Figure 11C:
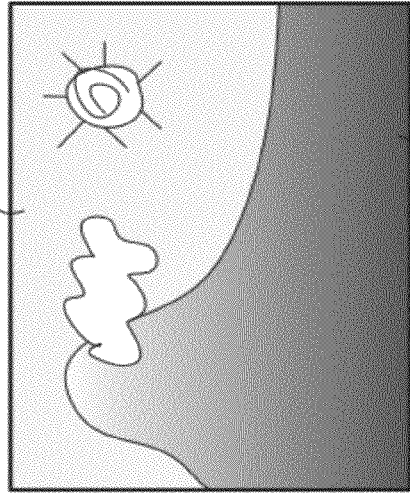

FIGS. 11A through 11C are diagrams illustrating examples of captured scenes. In FIG. 11A, a sky having a high luminance is disposed in the upper portion of the screen, whereas a ground surface having a low luminance is disposed in the lower portion of the screen. In such a scene, a luminance fluctuation will appear in the case where aperture driving is carried out while the line is being exposed in the upper or lower portion of the screen. FIGS. 11B and 11C illustrate such states; FIG. 11B illustrates a state in which a luminance fluctuation occurs in the upper region, where the luminance is higher, and in which overexposure has furthermore occurred. As opposed to this, in FIG. 11C, a luminance fluctuation has occurred in the upper region, where the luminance is higher, and the luminance has become lower than the surrounding region as a result. Comparing FIGS. 11B and 11C, the luminance fluctuation is harder to detect in FIG. 11B than in FIG. 11C, due to the influence of the luminance of the surrounding region. Likewise, the luminance fluctuation is harder to detect in FIG. 11B, where underexposure further occurs in the lower region due to the luminance fluctuation, than in FIG. 11C, in which the luminance in the lower region is higher than the luminance of the surrounding region.

In this manner, a luminance fluctuation is difficult to detect in the case where the combination of the luminance of the upper/lower regions within the screen and whether the luminance fluctuation caused by aperture driving makes the image brighter or darker meet a certain predetermined condition. Accordingly, in the case where the aperture driving cannot be carried out in the non-exposure period, whether to carry out the aperture driving during the exposure of the lower lines in the image area of Frame1 or carry out aperture driving during the exposure of the upper lines in the image area of Frame2' is determined based on the scene, and the timing at which the aperture driving is started is corrected.

Figure 12:
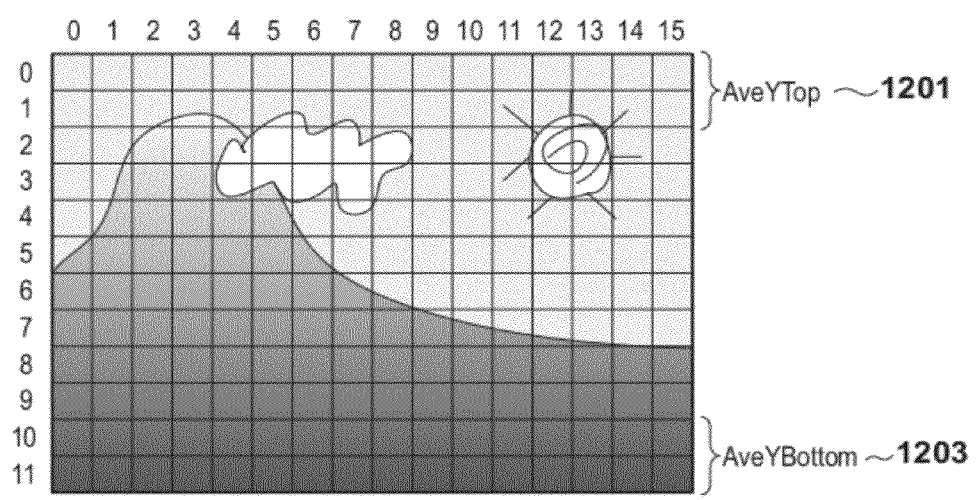
FIG. 12 is a diagram illustrating an example of a scene.

FIG. 12 illustrates a state in which a screen has been divided into blocks in order to extract luminosities in upper and lower regions of the screen. This operation of dividing the screen into blocks and extracting a luminance component Y value from the respective blocks can be carried out by the image processing circuit 50. Of the Y values of the respective blocks obtained by dividing the screen into blocks, an average Y value AveYTop (1201) of the blocks in Line0 and Line1 is calculated as the luminance value of the upper region of the screen. Likewise, an average Y value AveYBottom (1203) of the blocks in Line10 and Line11 is calculated as the luminance value of the lower region of the screen. Although the screen is divided into equal blocks in FIG. 12, the configuration may be such that a luminance average, a luminance distribution, or the like of the upper and lower regions within the screen is output directly.

In the case where the aperture is narrowed from Av 3 to Av 4 as in FIG. 9, the lower region of Frame1 darkens if the timing at which the aperture driving is started is earlier, whereas the upper region of Frame2' brightens if the timing at which the aperture driving is started is later. Using image data prior to Frame1, in which the aperture is not being driven, the luminance values AveYTop and AveYBottom in the upper and lower regions within the screen are calculated in advance. Then, when the aperture is closed in the direction that reduces the aperture, if the lower region in the screen is dark (that is, if the luminance value is less than or equal to a predetermined value), the timing of the aperture driving is advanced in FIG. 9, and the aperture driving is carried out while the lower line in Frame1 is being exposed. However, if the upper region in the screen is bright (that is, if the luminance value is greater than or equal to a predetermined value), the timing of the aperture driving is delayed, and the aperture driving is carried out while the upper line in Frame2' is being exposed. Likewise, when the aperture is opened in the direction that increases the aperture, if the lower region in the screen is bright, the timing of the aperture driving is advanced, and the aperture driving is carried out while the lower line in Frame1 is being exposed. In addition, if the upper region in the screen is dark, the timing of the aperture driving is delayed, and the aperture driving is carried out while the upper line in Frame2' is being exposed.

In this manner, although a luminance fluctuation does occur when the aperture driving is carried out during exposure, the luminance fluctuation can be reduced and made less apparent by carrying out a correction that advances/delays the timing of the aperture driving depending on the scene.

Figure 15:
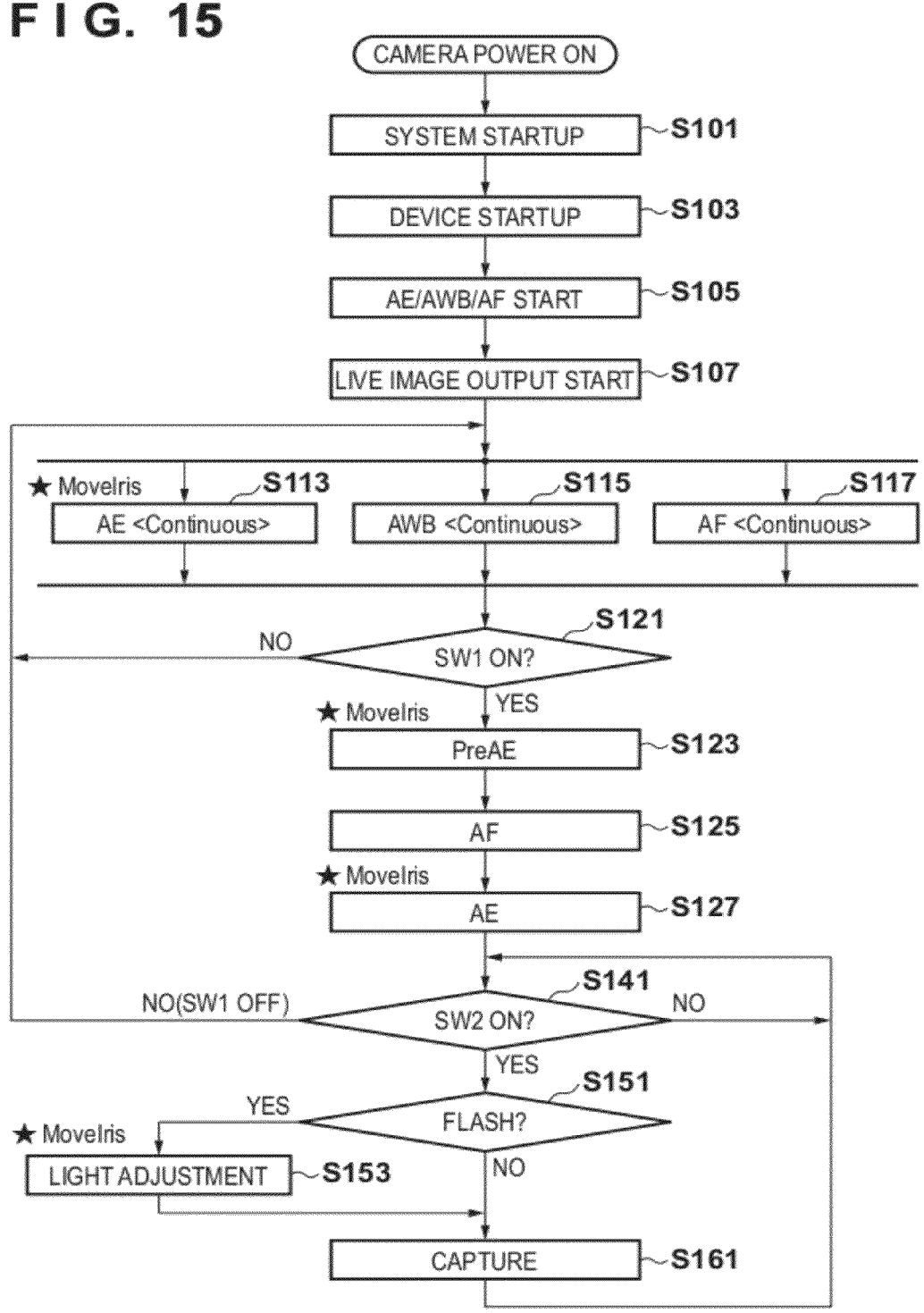
FIG. 15 is a flowchart illustrating overall operations performed by a camera.

Hereinafter, exposure control operations will be described using a flowchart. FIG. 15 is an overall flowchart for a camera provided with the exposure control according to the present embodiment.

When a power button 102 of the camera 100 has been depressed, a CPU that handles system control is started up, power is supplied to a memory or the like, and the camera system is started up (S101). Thereafter, a threading process for the lens 10 that is required by the camera during image capturing operations is carried out, various types of devices such as the mechanical shutter 12, the aperture 14, and so on, as well as devices such as the image sensor 16 and the image display device 108, are started up (S103). In the case where live view is to be carried out and an object image is to be displayed in the image display device 108 immediately after the camera has been started up, AE/AWB/AF processes are started so as to obtain an appropriate exposure, color, and focus for the image displayed in the image display device 108 (this will be called a "live image" hereinafter) (S105). Note that the AE/AWB/AF processes are controlled by the system control circuit 60. After this, the system control circuit 60 causes the image display device 108 to display a live image (S107).

During live view, AE/AWB/AF processes for continuing to adjust the exposure, color, and focus of the object in the live image are repeatedly carried out (S113, 5115, S117). In the AE process, exposure control based on changes in the object luminance is carried out in accordance with the program line chart for ContinuousAE illustrated in FIG. 4A, and here, there are cases where aperture control is carried out.

When the SW1 button is depressed as an instruction to carry out image capturing preparation operations (S121), the system control circuit 60 acquires the object luminance through a light measurement process that measures the object luminance. Then, for the AF process that is carried out thereafter (S125), control is carried out so as to obtain an exposure that is suitable for AF, in accordance with the program line chart for AF illustrated in FIG. 4B (S123), and there are cases where aperture control is carried out here as well.

After the AF has been carried out, the system control circuit 60 determines the exposure for still image capturing based on the still image capturing program line chart illustrated in FIG. 4C, and controls the aperture value for still image capturing at this point in time (S127).

In the case where it has been detected that SW2 has been depressed (S141), an image capturing process is started (S161). However, prior to the capturing, adjustment operations for measuring the amount of flash light in the case where the flash is activated, such as when capturing an image in a low-light environment, capturing a back-lit scene, and so on, are carried out (S153). For example, in the case where the object is at a close distance, there are cases where overexposure can be thought to occur due to the flash light even if the amount of flash light is set to a the minimum possible amount for the luminous tube; because overexposure can be suppressed by closing the aperture in the direction that reduces the aperture, there are cases where the aperture is controlled at this time.

Figure 13:
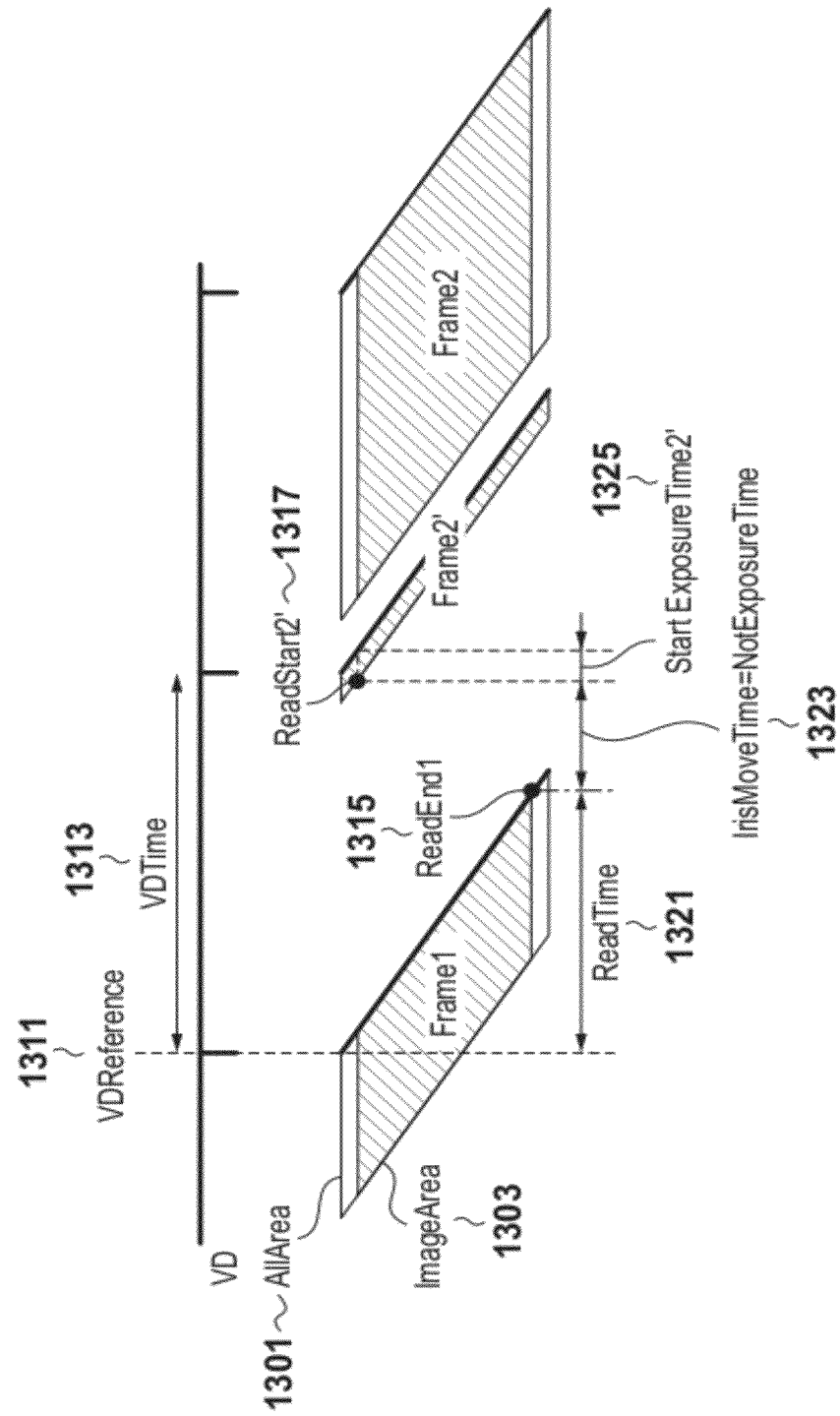
FIG. 13 is a timing chart illustrating exposure operations.
Figure 16:
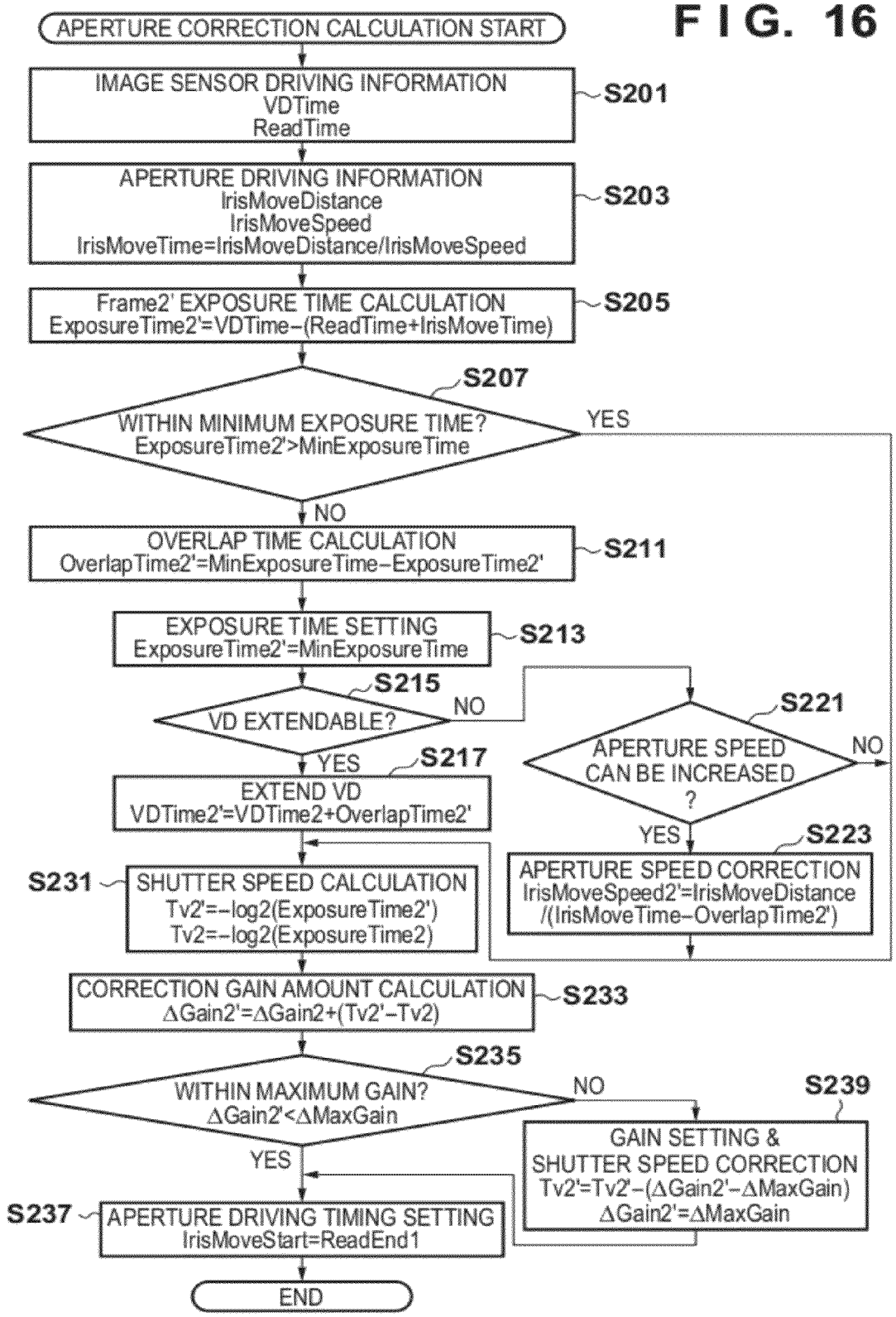
FIG. 16 is a flowchart illustrating the calculation of conditions of measures taken for luminance fluctuations.

A flow of processes performed by the system control circuit 60 in order to reduce luminance fluctuations caused by aperture driving, performed in the ContinuousAE (S113), SW1PreAE (S123), and SW1AE (S127) processes shown in the flowchart in FIG. 15, is illustrated in FIG. 16. The various timings illustrated in a timing chart shown in FIG. 13 will also be described along with a flowchart.

First, a vertical synchronization signal cycle VDTime (1313) and a time ReadTime (1321), spanning from a vertical synchronization signal reference VDReference (1311) to when the readout of the final line in the image area is started, is acquired as image sensor driving information (S201). Next, a time IrisMoveTime (1323) required for driving from the current aperture value to a target aperture value is calculated as aperture driving information (S203). In the case of a mechanism that drives the aperture at a predetermined speed using a stepping motor or the like, the IrisMoveTime is calculated based on a driving speed IrisMoveSpeed and a driving amount IrisMoveDistance. However, in the case where there is no mechanism for specifying the driving speed as desired, such as an aperture that is driven using a spring mechanism or the like, the time required to open/close the aperture may be held internally in advance, and may be read out and used as the IrisMoveTime.

What time to set the exposure time in Frame2' to in order to carry out aperture driving in the non-exposure period is then calculated (S205). A time obtained by subtracting the sum of ReadTime (1321) and IrisMoveTime (1323) from the vertical synchronization signal cycle VDTime (1313) is taken as the necessary exposure time ExposureTime2' of Frame2'. Next, it is checked whether the calculated necessary exposure time ExposureTime2' falls within a minimum exposure time MinExposureTime defined in advance (S207). The minimum exposure time is set based on the control limits of the hardware, including the image sensor, and because a shutter speed that is too fast will result in an unnatural continuous image when the object moves, the minimum exposure time is set from the standpoint of image quality. In the case where the calculated exposure time ExposureTime2' can be realized, that exposure time is employed, but in the case where that exposure time cannot be realized, it is checked whether it is possible to lengthen the cycle of the vertical synchronization signal (called the "VD cycle" hereinafter) and whether it is possible to increase the speed of the aperture driving.

First, in the case where it is not possible to realize the necessary exposure time ExposureTime2', to what extent the VD cycle needs to be lengthened in order to realize that exposure time is calculated (S211), and thereafter, a starting exposure time ExposureTime2' (1325) is determined to be the minimum exposure time MinExposureTime. If live view, in which a moving picture is not recorded, is being carried out, it is determined that the VD cycle is not strictly defined, and thus the VD can be extended (S215); if the VD can be extended, a VDTime2' is calculated by adding an insufficient time OverlapTime2' calculated earlier. This is then taken as the VD cycle for Frame2'. In the case where a moving picture is being captured and VD cannot be extended, it is checked whether or not it is possible to increase the aperture driving speed (S221). In the case where it is possible to increase the aperture driving speed, the aperture driving speed is recalculated so that the aperture value can be controlled to a desired aperture value within the current non-exposure period, and IrisMoveSpeed2' is calculated within the range of the upper limit of the aperture driving speed (S223). The exposure time ExposureTime2' for carrying out the correction is determined in this manner, and if possible based on the various circumstances, the VD extension time and the aperture driving speed are calculated.

Shutter speeds for a correction exposure time and an original target exposure time are respectively calculated as Tv2' and Tv2 (S231). Tv2 is an original control target shutter speed, whereas Tv2' is a shutter speed for securing the non-exposure period; the difference between Tv2' and Tv2 is the amount of underexposure caused by increasing the shutter speed. For this reason, the gain is used to correct the underexposure caused by increasing the shutter speed (S233). The result of adding the difference between Tv2' and Tv2 to an original control target gain ΔGain2 is a correction gain value ΔGain2'.

An upper limit ΔMaxGain is set in advance for the correction gain (that is, a correction range is determined in advance) so that the S/N of the image does not worsen too much due to an increase in the sensitivity resulting from the gain, and it is checked whether the calculated ΔGain2' is within the upper limit range (S235). In the case where the ΔGain2' exceeds the upper limit, the correction gain ΔGain2' is set as an upper limit value ΔMaxGain, and a number of steps by which the sensitivity cannot be increased is subtracted from the correction shutter speed Tv2' calculated earlier (S239). The correction shutter speed Tv2' and the correction gain ΔGain2' are calculated as described thus far, and the aperture driving start time is set as a ReadTime at which the exposure of the final line in the image area of Frame1 has ended (S237). Through this, the various conditions for carrying out aperture driving within the non-exposure period are determined.

Figure 17:
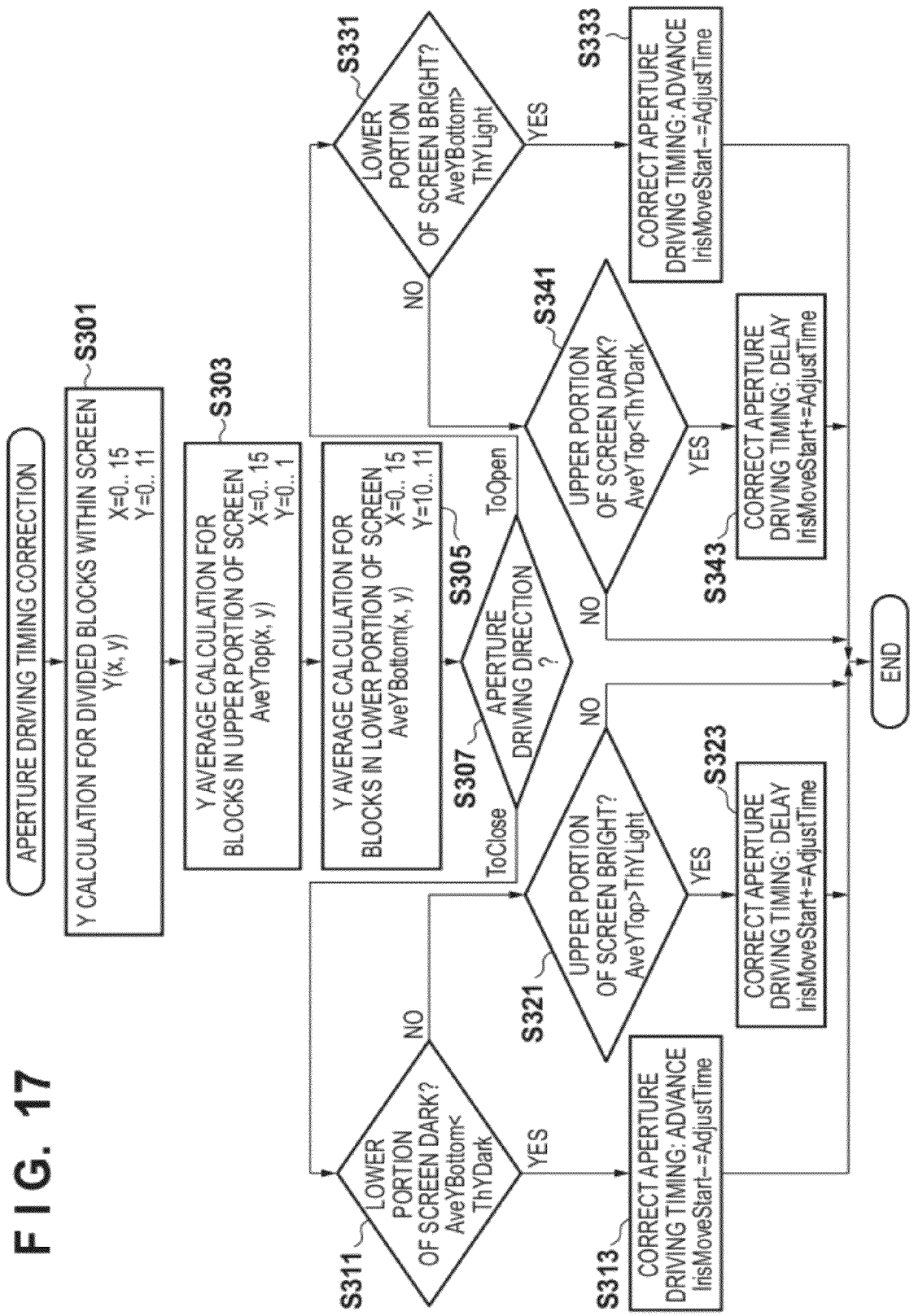
FIG. 17 is a flowchart illustrating the correction of scene-based aperture driving timing.

In the case where the aperture driving cannot be carried out within the non-exposure period as a result of determining the various conditions for carrying out the non-exposure period aperture driving through the flow illustrated in FIG. 16, the flowchart in FIG. 17 is applied, and an aperture driving timing at which the luminance fluctuation is not apparent is set in accordance with the scene.

First, using an image generated by the image processing circuit 50 in advance prior to the aperture driving, the screen is divided into blocks as shown in FIG. 12, and a Y value is calculated for each of the blocks (S301). Next, the system control circuit 60 uses the block Y values to calculate the average Y value AveYTop of the blocks in the upper region of the screen and the average Y value AveYBottom of the blocks in the lower region of the screen (S303, S305). In the present embodiment, this is carried out on two blocks each in the upper and lower regions, but the blocks to be used may be set as desired.

Next, the system control circuit 60 specifies conditions based on the direction of aperture driving (S307). This is because there are differences in the luminance fluctuations that occur when the timing of the aperture driving has been shifted depending on whether the direction of aperture driving is the opening direction or the closing direction. In the case where the direction of the aperture driving is the closing direction, the system control circuit 60 checks whether or not the Y value in the lower region of the screen is darker than a predetermined condition ThYDark (S311). If the lower region is a dark scene, it is difficult to see the luminance fluctuation visually even if the Y value level of the dark region decreases even further. For this reason, the system control circuit 60 carries out timing correction by advancing the timing of the aperture driving and controlling the aperture to move in the closing direction while the line in the lower portion of the screen is being exposed in Frame1 (S313). In the case where the Y value in the lower region of the screen is not darker than the predetermined condition ThYDark, the system control circuit 60 then checks whether or not the Y value in the upper region of the screen is brighter than a predetermined condition ThYLight (S321). If the upper region is a bright scene, it is difficult to see the luminance fluctuation visually even if the Y value level of the bright region increases even further. For this reason, the system control circuit 60 carries out timing correction by delaying the timing of the aperture driving and controlling the aperture to move in the closing direction while the line in the upper portion of the screen is being exposed in Frame2' (S323).

In the case where the direction of the aperture driving has determined to be the opening direction in S307, the system control circuit 60 corrects the aperture driving timing in accordance with the Y values in the upper and lower regions of the screen, based on the same line of thought as with the closing direction (S343, S333). Through this, the luminance fluctuations can be visually reduced.

As described thus far, when carrying out aperture driving in a state in which a continuous image is being generated, such as during live view, during moving picture capturing, and so on, the aperture driving is carried out in accordance with a non-exposure period, which is a period in which charge accumulation is not being carried out on the pixels in the image area; this makes it possible to make it difficult for the brightness of the image to fluctuate in a continuous image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-014384, filed Jan. 26, 2011 which is hereby incorporated by reference herein in its entirety.

What is claimed is:

1. An image capture apparatus that carries out exposure control by driving an aperture, the apparatus comprising:
   an image sensor, including multiple pixels, that accumulates and transfers charges per predetermined pixel group;
   a determination unit that determines an image region in the image sensor that serves as a region from which to output image data for recording or image data for display;
   a control unit that drives the aperture within a predetermined period; and
   a changing unit that changes a cycle of the readout of the image data for recording or the image data for display from the image sensor,
   wherein the predetermined period includes a period where charge accumulation or charge transfer for the pixels which are not included in the image region is being carried out, and does not include a period where charge accumulation or charge transfer for the pixels which are included in the image region is being carried out, and
   wherein the changing unit changes the cycle of the readout in order to drive the aperture within the predetermined period.

2. The image capture apparatus according to claim 1, further comprising:
   an operation unit that receives an operation for determining the image region,
   wherein the determination unit determines the image region based on an operation received by the operation unit.

3. The image capture apparatus according to claim 1,
   wherein the determination unit determines the image region based on the aspect ratio of an image that is based on the image data for recording or the image data for display.

4. The image capture apparatus according to claim 1,
   wherein the determination unit determines the image region based on the factor of a digital zoom during capturing.

5. The image capture apparatus according to claim 1, further comprising:
   a recording unit that records data based on the image data for recording into a recording medium.

6. The image capture apparatus according to claim 1, further comprising:
   a display unit that displays an image based on the image data for display.

7. The image capture apparatus according to claim 1,
   wherein the control unit changes the driving speed of the aperture in order to drive the aperture during the predetermined period.

8. A control method for an image capture apparatus, the apparatus including an image sensor having multiple pixels that accumulates and transfers charges per predetermined pixel group and carrying out exposure control by driving an aperture, the method comprising the steps of:
　determining an image region in the image sensor that serves as a region from which to output image data for recording or image data for display;
　driving the aperture within a predetermined period; and
　changing a cycle of the readout of the image data for recording or the image data for display from the image sensor,
　wherein the predetermined period includes a period where charge accumulation or charge transfer for the pixels which are not included in the image region is being carried out, and does not include a period where charge accumulation or charge transfer for the pixels which are included in the image region is being carried out, and
　wherein in said changing step, the cycle of the readout is changed in order to drive the aperture within the predetermined period.

9. An image capture apparatus that carries out exposure control by driving an aperture, the apparatus comprising:
　an image sensor, including multiple pixels, that accumulates and transfers charges per predetermined pixel group;
　a determination unit that determines an image region in the image sensor that serves as a region from which to output image data for recording or image data for display;
　a control unit that drives the aperture, and
　a setting unit that sets a cycle of the readout of the image data,
　wherein the setting unit sets the cycle so that driving of the aperture is finished within a period where charge accumulation or charge transfer for the pixels which are included in the image region is not being carried out.

10. An image capture apparatus that carries out exposure control by driving an aperture, the apparatus comprising:
　an image sensor, including multiple pixels, that accumulates and transfers charges per predetermined pixel group;
　a determination unit that determines an image region in the image sensor that serves as a region from which to output image data for recording or image data for display;
　a control unit that drives the aperture, and
　an acquiring unit that acquires luminance values of multiple regions within the image region,
　wherein in a case where the driving direction of the aperture and a luminance value near an end where accumulation of charge starts earlier in the image region acquired by the acquiring unit or a luminance value near an end where the accumulation of charge starts later in the image region fulfill a predetermined condition, the control unit drives the aperture so that a period where charge accumulation for the image data for recording or the image data for display is being carried out for the pixels near the end where the accumulation of a charge starts earlier in the image region or near the end where the accumulation of charge starts later in the image region overlaps with at least part of the aperture driving period.

11. A method of controlling an image capture apparatus that carries out exposure control by driving an aperture and has an image sensor, including multiple pixels, that accumulates and transfers charges per predetermined pixel group, said method comprising the steps of:
　determining an image region in the image sensor that serves as a region from which to output image data for recording or image data for display;
　controlling to drive the aperture, and
　setting a cycle of the readout of the image data,
　wherein the setting step sets the cycle so that driving of the aperture is finished within a period where charge accumulation or charge transfer for the pixels which are included in the image region is not being carried out.

12. A method of controlling an image capture apparatus that carries out exposure control by driving an aperture and has an image sensor, including multiple pixels, that accumulates and transfers charges per predetermined pixel group, said method comprising the steps of:
　determining an image region in the image sensor that serves as a region from which to output image data for recording or image data for display;
　controlling to drive the aperture, and
　acquiring luminance values of multiple regions within the image region,
　wherein in a case where the driving direction of the aperture and a luminance value near an end where accumulation of charge starts earlier in the image region acquired in the acquiring step or a luminance value near an end where the accumulation of charge starts later in the image region fulfill a predetermined condition, the control step drives the aperture so that a period where charge accumulation for the image data for recording or the image data for display is being carried out for the pixels near the end where the accumulation of a charge starts earlier in the image region or near the end where the accumulation of charge starts later in the image region overlaps with at least part of the aperture driving period.

* * * * *